(12) United States Patent
Han et al.

(10) Patent No.: US 12,088,367 B2
(45) Date of Patent: Sep. 10, 2024

(54) METHOD AND ELECTRONIC DEVICE FOR CONTROLLING TRANSMISSION POWER FOR MULTI-BEAM TRANSMISSION

(71) Applicant: Samsung Electronics Co., Ltd., Suwon-si (KR)

(72) Inventors: Janghoon Han, Suwon-si (KR); Dongil Son, Suwon-si (KR); Yeonwoo Kim, Suwon-si (KR); Sunmin Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/159,332

(22) Filed: Jan. 25, 2023

(65) Prior Publication Data

US 2023/0170948 A1 Jun. 1, 2023

Related U.S. Application Data

(63) Continuation of application No. PCT/KR2021/006951, filed on Jun. 3, 2021.

(30) Foreign Application Priority Data

Jul. 30, 2020 (KR) .......................... 10-2020-0095239

(51) Int. Cl.
*H04B 7/0426* (2017.01)
*H04B 7/0408* (2017.01)
(Continued)

(52) U.S. Cl.
CPC ........... *H04B 7/043* (2013.01); *H04B 7/0408* (2013.01); *H04B 7/0695* (2013.01); *H04W 52/367* (2013.01)

(58) Field of Classification Search
CPC .... H04B 7/10; H04B 7/06952; H04B 7/0695; H04B 7/0408; H04B 7/06956;
(Continued)

(56) References Cited

U.S. PATENT DOCUMENTS 8,643,562 B2* 2/2014 Chang .................... H01Q 21/20
343/824
8,693,970 B2* 4/2014 Corman .................... H04B 7/10
343/756

(Continued)

FOREIGN PATENT DOCUMENTS

KR  10-2015-0121184 A  10/2015
KR  10-2019-0012827 A  2/2019
(Continued)

OTHER PUBLICATIONS

International Search Report dated Sep. 30, 2021, issued in International Patent Application No. PCT/KR2021/006951.
(Continued)

*Primary Examiner* — James M Perez
(74) *Attorney, Agent, or Firm* — Jefferson IP Law, LLP

(57) ABSTRACT

A mobile electronic device may be configured to identify multiple beams is provided. The mobile electronic device includes a first beam and a second beam for communication with at least one base station, when the first beam and the second beam correspond to the same first direction, identify a third beam which corresponds to a direction differing from the first direction and has a strength of a signal received from the at least one base station, the strength being equal to or greater than a designated value, when the identification of the third beam fails, apply, to the first beam and the second beam, a power back-off for multiple beams corresponding to the same direction, so as to perform communication with the at least one base station, and when the third beam is identified, change the second beam to the third beam and (Continued)

perform communication with the at least one base station without applying the power back-off for multiple beams corresponding to the same direction and by using the first beam and the third beam.

16 Claims, 20 Drawing Sheets

(51) Int. Cl.
*H04B 7/06* (2006.01)
*H04W 52/36* (2009.01)

(58) Field of Classification Search
CPC ..... H04B 7/043; H04B 17/318; H04W 52/42; H04W 52/367; H04W 52/146
See application file for complete search history.

(56) References Cited

U.S. PATENT DOCUMENTS

| | | | | |
|---|---|---|---|---|
| 9,225,396 B2* | 12/2015 | Maltsev | ........... | H04W 52/36 |
| 9,246,571 B2* | 1/2016 | Wang | ........... | H04B 7/043 |
| 9,362,991 B2* | 6/2016 | Maltsev | ........... | H04B 7/0617 |
| 9,391,678 B2* | 7/2016 | Maltsev | ........... | H04W 52/346 |
| 9,596,662 B2* | 3/2017 | Kim | ........... | H04W 72/21 |
| 9,609,604 B2* | 3/2017 | Kim | ........... | H04W 52/365 |
| 9,648,571 B2* | 5/2017 | Kim | ........... | H04W 72/21 |
| 9,655,065 B2* | 5/2017 | Kim | ........... | H04W 52/545 |
| 9,674,797 B2* | 6/2017 | Kim | ........... | H04W 52/545 |
| 9,713,105 B2* | 7/2017 | Kim | ........... | H04W 52/365 |
| 10,153,831 B1* | 12/2018 | Gokhale | ........... | H04B 7/18563 |
| 10,243,277 B2* | 3/2019 | Chang | ........... | H01Q 21/0075 |
| 10,291,309 B2* | 5/2019 | Chakraborty | ........... | H04B 7/0404 |
| 10,327,156 B2* | 6/2019 | Byun | ........... | H04W 72/56 |
| 10,348,381 B2* | 7/2019 | Jaldén | ........... | H04B 17/101 |
| 10,367,677 B2* | 7/2019 | Parkvall | ........... | H04B 7/0617 |
| 10,383,147 B2* | 8/2019 | Rajagopal | ........... | H04W 28/0284 |
| 10,389,424 B2* | 8/2019 | Jaldén | ........... | H04B 7/024 |
| 10,554,470 B2* | 2/2020 | John Wilson | ........... | H04J 11/0056 |
| 10,568,041 B2* | 2/2020 | MolavianJazi | ........... | H04W 52/10 |
| 10,660,044 B2* | 5/2020 | MolavianJazi | ........... | H04W 52/362 |
| 10,721,767 B2* | 7/2020 | Kim | ........... | H04W 36/0044 |
| 10,917,160 B2* | 2/2021 | Miyazaki | ........... | H04L 27/26 |
| 10,925,030 B2* | 2/2021 | Han | ........... | H04B 7/0617 |
| 10,945,216 B2* | 3/2021 | MolavianJazi | ........... | H04W 52/146 |
| 10,965,359 B2* | 3/2021 | Kim | ........... | H04B 7/0619 |
| 10,986,583 B2* | 4/2021 | MolavianJazi | ........... | H04W 52/365 |
| 11,019,666 B2* | 5/2021 | Zhang | ........... | H04W 52/325 |
| 11,038,264 B2* | 6/2021 | Son | ........... | H01Q 1/243 |
| 11,063,652 B2* | 7/2021 | Xiong | ........... | H04B 7/088 |
| 11,101,862 B2* | 8/2021 | Venugopal | ........... | H04B 7/0617 |
| 11,153,001 B2* | 10/2021 | Yu | ........... | H04B 7/0695 |
| 11,184,078 B2* | 11/2021 | Zhu | ........... | H04B 7/088 |
| 11,184,921 B2* | 11/2021 | Kim | ........... | H04W 36/0044 |
| 11,211,695 B1* | 12/2021 | Paulsen | ........... | H04B 7/0408 |
| 11,228,985 B2* | 1/2022 | Cha | ........... | H04W 52/367 |
| 11,277,238 B2* | 3/2022 | Chen | ........... | H04L 5/0094 |
| 11,304,194 B2* | 4/2022 | Kim | ........... | H04L 5/0032 |
| 11,342,973 B1* | 5/2022 | Aldalbahi | ........... | H04B 7/0473 |
| 11,350,370 B2* | 5/2022 | MolavianJazi | ........... | H04W 52/54 |
| 11,411,614 B1* | 8/2022 | Yang | ........... | H04B 7/0408 |
| 11,509,369 B2* | 11/2022 | Ji | ........... | H04B 7/063 |
| 11,528,067 B2* | 12/2022 | Kim | ........... | H04B 7/088 |
| 11,540,227 B2* | 12/2022 | MolavianJazi | ........... | H04W 52/242 |
| 11,617,214 B2* | 3/2023 | Zhang | ........... | H04W 52/42 370/329 |
| 11,622,288 B2* | 4/2023 | Raghavan | ........... | H04B 7/063 375/267 |
| 11,700,048 B1* | 7/2023 | Zheng | ........... | H04B 7/086 375/372 |
| 11,777,561 B2* | 10/2023 | Sevindik | ........... | H04B 7/0617 375/262 |
| 11,785,556 B2* | 10/2023 | Cha | ........... | H04W 52/34 455/202 |
| 11,792,739 B2* | 10/2023 | MolavianJazi | ........... | H04W 52/54 455/522 |
| 11,838,944 B2* | 12/2023 | Kim | ........... | H04W 36/0077 |
| 11,870,516 B2* | 1/2024 | Ibrahim | ........... | H04B 7/0495 |
| 11,903,038 B2* | 2/2024 | Zhang | ........... | H04L 5/0053 |
| 11,917,552 B2* | 2/2024 | Cha | ........... | H04B 1/3838 |
| 2011/0105045 A1* | 5/2011 | Tanaka | ........... | H04W 72/046 455/67.11 |
| 2012/0026054 A1* | 2/2012 | Liu | ........... | H01Q 21/20 343/824 |
| 2013/0088391 A1* | 4/2013 | Corman | ........... | H04B 7/18515 342/365 |
| 2013/0115886 A1* | 5/2013 | Khan | ........... | H01Q 21/061 455/39 |
| 2013/0331039 A1* | 12/2013 | Hillstrom | ........... | H04B 7/10 455/39 |
| 2015/0085761 A1* | 3/2015 | Maltsev | ........... | H04B 7/0452 370/329 |
| 2015/0365908 A1* | 12/2015 | Maltsev | ........... | H04W 52/42 455/522 |
| 2016/0226154 A1* | 8/2016 | Chang | ........... | H01Q 21/20 |
| 2017/0244451 A1* | 8/2017 | Raghavan | ........... | H04L 7/04 |
| 2017/0331670 A1* | 11/2017 | Parkvall | ........... | H04W 52/0251 |
| 2018/0054832 A1* | 2/2018 | Luo | ........... | H04B 7/0691 |
| 2018/0145742 A1* | 5/2018 | Li | ........... | H04B 7/0874 |
| 2018/0184387 A1* | 6/2018 | Axén | ........... | H04W 52/143 |
| 2018/0199258 A1* | 7/2018 | Cezanne | ........... | H04W 72/0453 |
| 2018/0263025 A1* | 9/2018 | Kim | ........... | H04W 84/00 |
| 2018/0278318 A1* | 9/2018 | Chakraborty | ........... | H04W 52/367 |
| 2019/0037423 A1* | 1/2019 | Yu | ........... | H04B 7/0695 |
| 2019/0037530 A1* | 1/2019 | Han | ........... | H04W 16/28 |
| 2019/0141640 A1* | 5/2019 | Abedini | ........... | H04W 52/146 |
| 2019/0150003 A1* | 5/2019 | He | ........... | H04B 7/0617 342/368 |
| 2019/0159135 A1* | 5/2019 | MolavianJazi | ........... | H04W 52/08 |
| 2019/0159136 A1* | 5/2019 | MolavianJazi | ........... | H04W 52/365 |
| 2019/0199571 A1* | 6/2019 | John Wilson | ........... | H04W 52/146 |
| 2019/0222279 A1* | 7/2019 | Xi | ........... | H04B 7/0617 |
| 2019/0373559 A1* | 12/2019 | Davydov | ........... | H04W 52/42 |
| 2019/0387417 A1* | 12/2019 | Nilsson | ........... | H04B 7/088 |
| 2020/0021016 A1* | 1/2020 | Son | ........... | H01Q 21/065 |
| 2020/0037254 A1* | 1/2020 | Comsa | ........... | H04W 52/362 |
| 2020/0145070 A1* | 5/2020 | Raghavan | ........... | H04B 7/0874 |
| 2020/0170003 A1* | 5/2020 | Kim | ........... | H04L 5/0032 |
| 2020/0229104 A1* | 7/2020 | MolavianJazi | ........... | H04W 52/146 |
| 2020/0274593 A1* | 8/2020 | Kim | ........... | H04W 16/28 |
| 2020/0280128 A1* | 9/2020 | Rafique | ........... | H01Q 3/267 |
| 2020/0280928 A1* | 9/2020 | MolavianJazi | ........... | H04W 72/21 |
| 2020/0367230 A1* | 11/2020 | Raghavan | ........... | H04W 72/044 |
| 2020/0396694 A1* | 12/2020 | Comsa | ........... | H04W 52/365 |
| 2021/0051601 A1* | 2/2021 | Cha | ........... | H04B 1/3838 |
| 2021/0068077 A1* | 3/2021 | Raghavan | ........... | H04B 7/0404 |
| 2021/0168726 A1* | 6/2021 | MolavianJazi | ........... | H04W 52/08 |
| 2021/0204346 A1* | 7/2021 | Ye | ........... | H04B 7/00 |
| 2021/0211987 A1* | 7/2021 | MolavianJazi | ........... | H04L 5/001 |
| 2021/0218449 A1* | 7/2021 | Kim | ........... | H04W 16/28 |
| 2021/0234593 A1* | 7/2021 | Raghavan | ........... | H04B 7/0623 |
| 2021/0234604 A1* | 7/2021 | Raghavan | ........... | H04L 5/001 |
| 2021/0328639 A1* | 10/2021 | Karakkad Kesavan Namboodiri | ........... | H04B 7/0695 |
| 2021/0344558 A1* | 11/2021 | Lee | ........... | H04L 41/0803 |
| 2021/0385759 A1* | 12/2021 | Comsa | ........... | H04W 52/281 |
| 2021/0391904 A1* | 12/2021 | Jam | ........... | H04B 7/0842 |
| 2022/0045734 A1* | 2/2022 | Liu | ........... | H04W 16/28 |
| 2022/0109490 A1* | 4/2022 | Ma | ........... | H04W 72/20 |
| 2022/0132438 A1* | 4/2022 | Cha | ........... | H04W 52/34 |
| 2022/0159584 A1* | 5/2022 | Cha | ........... | H04B 1/3838 |
| 2022/0294519 A1* | 9/2022 | Ling | ........... | H04B 7/088 |
| 2022/0295415 A1* | 9/2022 | MolavianJazi | ........... | H04W 52/367 |
| 2022/0377799 A1* | 11/2022 | MolavianJazi | ........... | H04L 5/0048 |
| 2023/0027976 A1* | 1/2023 | Park | ........... | H04B 17/309 |
| 2023/0109947 A1* | 4/2023 | Parkvall | ........... | H04J 11/0079 455/418 |
| 2023/0121938 A1* | 4/2023 | Zhou | ........... | H04W 72/23 375/347 |
| 2023/0125174 A1* | 4/2023 | Sevindik | ........... | H04W 52/42 375/262 |

(56) References Cited

U.S. PATENT DOCUMENTS

| | | | |
|---|---|---|---|
| 2023/0170948 A1* | 6/2023 | Han | H04W 52/367 |
| | | | 375/267 |
| 2023/0292236 A1* | 9/2023 | Jiang | H04W 52/0212 |
| 2024/0048196 A1* | 2/2024 | Caporal Del Barrio | ...... |
| | | | H04B 7/0608 |
| 2024/0049142 A1* | 2/2024 | MolavianJazi | H04W 52/42 |
| 2024/0088975 A1* | 3/2024 | Vieira | H04B 7/0617 |
| 2024/0097769 A1* | 3/2024 | Luo | H04B 17/3913 |

FOREIGN PATENT DOCUMENTS

| KR | 10-2020-0083469 A | 7/2020 |
|---|---|---|
| WO | 2020-140353 A1 | 7/2020 |

OTHER PUBLICATIONS

Extended European Search Report dated Oct. 5, 2023, issued in European Patent Application No. 21849258.5.

* cited by examiner

METHOD AND ELECTRONIC DEVICE FOR CONTROLLING TRANSMISSION POWER FOR MULTI-BEAM TRANSMISSION

CROSS-REFERENCE TO RELATED APPLICATION(S)

This application is a continuation application, claiming priority under § 365(c), of an International application No. PCT/KR2021/006951, filed on Jun. 3, 2021, which is based on and claims the benefit of a Korean patent application number 10-2020-0095239, filed on Jul. 30, 2020, in the Korean Intellectual Property Office, the disclosure of which is incorporated by reference herein in its entirety.

BACKGROUND

1. Field

The disclosure relates to a method and electronic device for controlling transmission power for multi-beam transmission.

2. Description of Related Art

In order to meet the increasing demand for network traffic, 5th generation (5G) mobile communication technology, which uses high-frequency band signals, is developed. For example, millimeter wave (mmWave) (e.g., signals of 20 gigahertz (GHz) to 200 GHz band), in which a signal has a wavelength in millimeters, may be used in 5th generation mobile communication. In general, it is required to reduce path loss of radio waves and increase a propagation distance of radio waves in order to smoothly provide a wireless communication service in a high-frequency band. For these reasons, a mobile electronic device performs beamforming in a 5G communication system. Unlike an omni-directional beam pattern, a beamformed beam pattern of an electronic device may have relatively high directivity.

When the electronic device communicates using beamforming, the electronic device may perform communication with a beam having a relatively sharp beam pattern. The electronic device may use a plurality of antenna arrays in order to generate beam coverage in multiple directions of the electronic device. Each of the plurality of antenna arrays may be positioned inside a housing of the electronic device to form a beam in a different direction.

The above information is presented as background information only to assist with an understanding of the disclosure. No determination has been made, and no assertion is made, as to whether any of the above might be applicable as prior art with regard to the disclosure.

SUMMARY

An electronic device may communicate with a base station by transmitting a wireless signal of a specified frequency. A mobile electronic device such as a smartphone may be positioned close to a user to transmit/receive wireless signals. The electronic device may control transmission power in order to reduce an effect of a wireless signal on the user. For example, the electronic device may control the transmission power based on a specific absorption rate (SAR) limitation. The SAR limit may be set based on the amount of radio frequency energy absorbed per unit time by a human body. In the case of a high-frequency band signal, the electronic device may control the transmission power based on a maximum permissible exposure (MPE) limitation. For example, the electronic device may control the transmission power based on the SAR limitation and/or power density limitation.

The electronic device may have a transmission power limit set for respective beams. However, even in a case that each of the beams satisfies the power density (PD) standard, total emission of multiple beams may not satisfy a power density (PD) standard (e.g., maximum power emission standard) when the electronic device performs multi-beam transmission. Therefore, due to multi-beam transmission, the user may expose to an RF signal that exceeds a safety standard.

Aspects of the disclosure are to address at least the above-mentioned problems and/or disadvantages and to provide at least the advantages described below. Accordingly, an aspect of the disclosure is to provide a transmission power control method and an electronic device therefor considering a PD standard during multi-beam transmission.

Additional aspects will be set forth in part in the description which follows and, in part, will be apparent from the description, or may be learned by practice of the presented embodiments.

In accordance with an aspect of the disclosure, a mobile electronic device is provided. The mobile electronic device includes at least one antenna module including at least one array antenna, a processor operatively connected to the at least one antenna module, and a memory operatively connected to the processor, wherein the memory includes instructions that, when executed, cause the processor to identify a plurality of beams including a first beam and a second beam for communicating with at least one base station using the at least one antenna module, identify, when the first beam and the second beam correspond to a same first direction, a third beam which corresponds to a direction different from the first direction and of which receive signal strength from the at least one base station is at least a specified value, communicate with the at least one base station by applying, to the first beam and the second beam, power backoff for beams corresponding to the same direction when identification of the third beam fails, and change the second beam for the third beam and communicate with the at least one base station using the first beam and the third beam without applying the power backoff for beams corresponding to the same direction when the third beam is identified.

In accordance with another aspect of the disclosure, a method for multi-beam transmission of a mobile communication device is provided. The method includes identifying a plurality of beams including a first beam and a second beam to be used for transmission, determining whether the first beam and the second beam correspond to a same first direction, determining whether a third beam which corresponds to a direction different from the first direction and of which receive signal strength is at least a specified value is present when the first beam and the second beam correspond to the same first direction, transmitting a signal by applying, to the first beam and the second beam, power backoff for beams corresponding to the same direction when the third beam is not present, and changing the second beam for the third beam and transmitting the signal without applying the power backoff for beams corresponding to the same direction when the third beam is present.

In accordance with another aspect of the disclosure, a mobile electronic device is provided. The mobile electronic device includes a first antenna module including at least one array antenna, a second antenna module including at least one array antenna, a processor operatively connected to the first antenna module and the second antenna module, and a memory operatively connected to the processor, wherein the memory may store instructions that, when executed, cause the processor to form a first beam and a second beam using at least one of the first antenna module or the second antenna module, and control transmission power associated with the first beam and the second beam based on maximum transmission power that is relatively low compared to that of single-beam transmission when the first beam and the second beam correspond to the same direction.

According to various embodiments of the disclosure, an electronic device may minimize the effect of a transmission signal on a human body while maintaining data transmission performance by controlling transmission power based on beam directions.

According to various embodiments of the disclosure, an electronic device may provide data transmission that satisfies a maximum power emission (MPE) standard by controlling transmission power.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
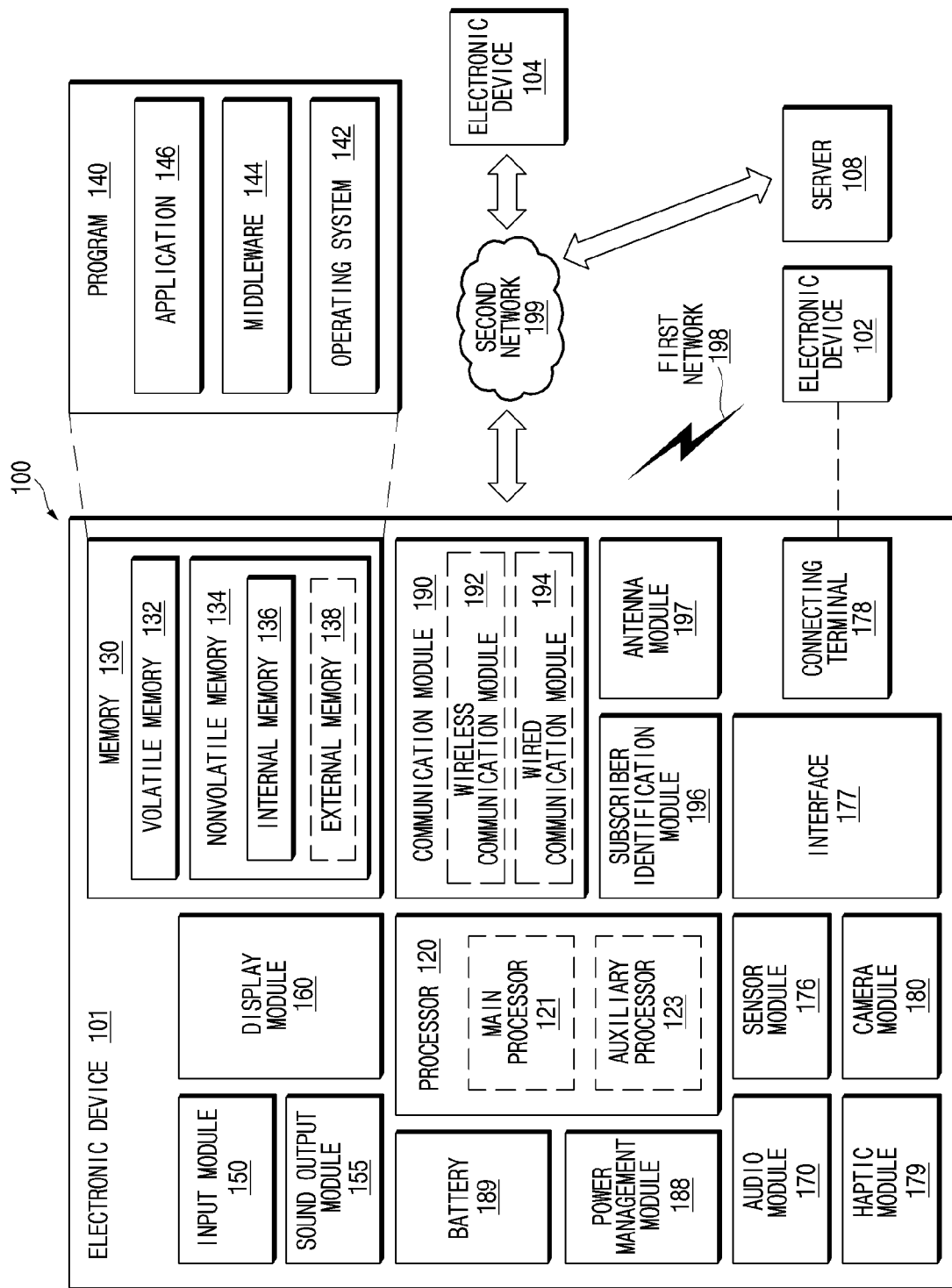
FIG. 1 illustrates an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment, the electronic device 101 may communicate with the external electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in another aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
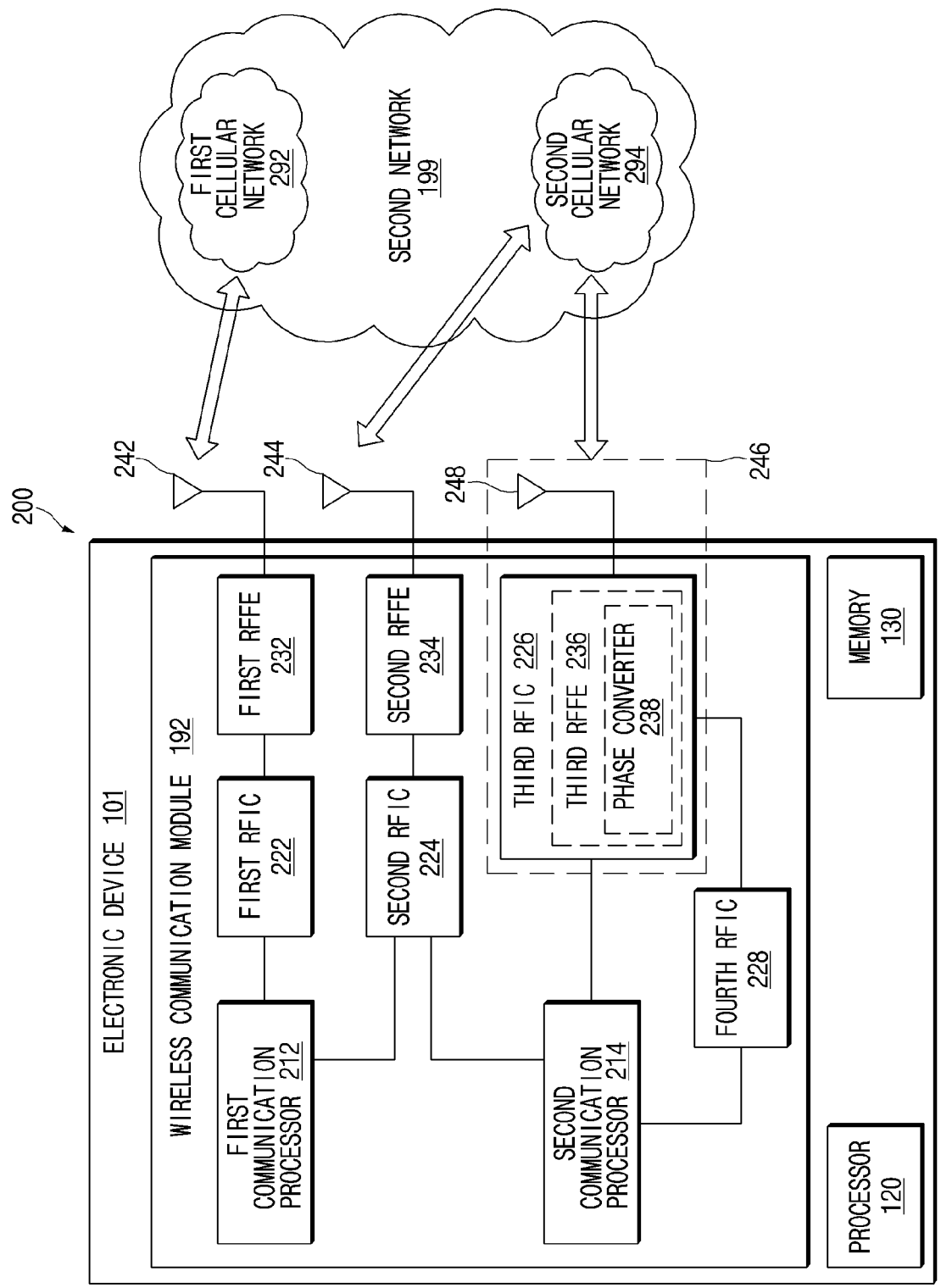
FIG. 2 is a block diagram illustrating an electronic device for supporting legacy network communication and 5G network communication according to an embodiment of the disclosure.

FIG. 2 is a block diagram illustrating an electronic device for supporting legacy network communication and 5G network communication according to an embodiment of the disclosure.

Referring to FIG. 2, in a system 200, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. A second network 199 may include a first cellular network 292 and a second cellular network 294. According to another embodiment, the electronic device 101 may further include at least one of the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least a portion of the wireless communication module 192. According to another embodiment, the fourth RFIC 228 may not be provided or may be included as a portion of the third RFIC 226.

The first communication processor 212 may support establishment of a communication channel of a band to be used for wireless communication with the first cellular network 292 and support legacy network communication through an established communication channel. According to various embodiments, the first cellular network 292 may be a legacy network including at least one of a second generation (2G), third generation (3G), fourth generation (4G), or long-term evolution (LTE) network. The second communication processor 214 may support establishment of a communication channel corresponding to a specified band (e.g., about 6 GHz to about 60 GHz) among bands to be used for wireless communication with the second cellular network 294 and support 5G network communication through an established communication channel. According to various embodiments, the second cellular network 294 may be a 5G network defined by the third generation partnership project (3GPP). In addition, according to an embodiment, the first communication processor 212 or the second communication processor 214 may support establishment of a communication channel corresponding to another specified band (e.g., about 6 GHz or less) among bands used for wireless communication with the second cellular network 294 and support 5G network communication through an established communication channel. According to an embodiment, the first communication processor 212 and the second communication processor 214 may be implemented within a single chip or single package. According to various embodiments, the first communication processor 212 or the second communication processor 214 may be formed within a single chip or single package together with the processor 120, the auxiliary processor 123 or the communication module 190 of FIG. 1.

When performing transmission, the first RFIC 222 converts a baseband signal generated by the first communication processor 212 into a radio frequency (RF) signal of about 700 megahertz (MHz) to about 3 GHz used in the first cellular network 292 (e.g., a legacy network). When performing reception, an RF signal is obtained from the first cellular network 292 (e.g., a legacy network) via an antenna (e.g., the first antenna module 242) and may be preprocessed through an RFFE (e.g., the first RFFE 232). The first RFIC 222 may convert the preprocessed RF signal into a baseband signal so that the signal may be processed by the first communication processor 212.

When performing transmission, the second RFIC 224 converts a baseband signal generated by the first communication processor 212 or the second communication processor 214 into an RF signal (hereinafter referred to as a 5G Sub6 RF signal) of Sub6 band (e.g., about 6 GHz or less) used in the second cellular network 294 (e.g., a 5G network). When performing reception, a 5G Sub6 RF signal is obtained from the second cellular network 294 (e.g., a 5G network) via an antenna (e.g., the second antenna module 244) and may be preprocessed through an RFFE (e.g., the second RFFE 234). The second RFIC 224 may convert the preprocessed 5G Sub6 RF signal into a baseband signal so that the signal may be processed by a corresponding communication processor among the first communication processor 212 and the second communication processor 214.

The third RFIC 226 may convert a baseband signal generated by the second communication processor 214 into an RF signal (hereinafter referred to as a 5G Above6 RF signal) of 5G Above6 band (e.g., about 6 GHz to about 60 GHz) to be used in the second cellular network 294 (e.g., a 5G network). When performing reception, a 5G Above6 RF signal is obtained from the second cellular network 294 (e.g., a 5G network) via an antenna (e.g., the antenna 248) and may be preprocessed through a third RFFE 236. For example, the third RFFE 236 preprocess a signal using a phase converter 238. The third RFIC 226 may convert the preprocessed 5G Above6 RF signal into a baseband signal so that the signal may be processed by the second communication processor 214. According to another embodiment, the third RFFE 236 may be formed as a portion of the third RFIC 226.

According to another embodiment, the electronic device 101 may include the fourth RFIC 228 separately from the third RFIC 226 or as at least a portion of the third RFIC 226. In this case, the fourth RFIC 228 may convert a baseband signal generated by the second communication processor 214 into an RF signal (hereinafter referred to as an intermediate frequency (IF) signal) of an intermediate frequency band (e.g., about 9 GHz to about 11 GHZ), and then may transfer the IF signal to the third RFIC 226. The third RFIC 226 may convert the IF signal into a 5G Above6 RF signal. When performing reception, a 5G Above6 RF signal is received from the second cellular network 294 (e.g., a 5G network) via an antenna (e.g., the antenna 248) and may be converted into an IF signal by the third RFIC 226. The fourth RFIC 228 may convert the IF signal into a baseband signal so that the signal may be processed by the second communication processor 214.

According to another embodiment, the first RFIC 222 and the second RFIC 224 may be implemented as at least a portion of a single chip or single package. According to another embodiment, the first RFFE 232 and the second RFFE 234 may be implemented as at least a portion of a single chip or single package. According to another embodiment, at least one antenna module among the first antenna module 242 and the second antenna module 244 may not be provided or may be combined with another antenna module so as to process RF signals of a plurality of corresponding bands.

According to another embodiment, the third RFIC 226 and the antenna 248 may be arranged on the same substrate to form the third antenna module 246. For example, the wireless communication module 192 or the processor 120 may be arranged on a first substrate (e.g., main PCB). In this case, the third RFIC 226 is arranged in a partial region (e.g., lower surface) of a second substrate (e.g., sub PCB) that is separate from the first substrate and the antenna 248 may be arranged in another partial region (e.g., upper surface) to form the third antenna module 246. According to another embodiment, the antenna 248 may include, for example, an antenna array that may be used for beamforming. It is possible to decrease a length of a transmission line between the third RFIC 226 and the antenna 248 by arranging the third RFIC 226 and the antenna 248 on the same substrate. This configuration, for example, may reduce loss (e.g., attenuation), caused by the transmission line, of a signal of a high frequency band (e.g., about 6 GHz to about 60 GHZ) used in 5G network communication. Accordingly, the electronic device 101 may improve quality or speed of communication with the second cellular network 294 (e.g., a 5G network).

The second cellular network 294 (e.g., a 5G network) may operate independent of the first cellular network 292 (e.g., a legacy network) (e.g., Stand-Alone (SA)) or may operate by being connected thereto (e.g., Non-Stand Alone (NSA)). For example, a 5G network includes only an access network (e.g., 5G radio access network (RAN) or next generation RAN (NG RAN)), and may not have a core network (e.g., next generation core (NGC)). In this case, the electronic device 101 accesses an external network (e.g., the Internet) by being controlled by a core network (e.g., evolved packed core (EPC)) of a legacy network after accessing the access network of the 5G network. Protocol information (e.g., LTE protocol information) for communicating with a legacy network or protocol information (e.g., New Radio (NR) protocol information) for communicating with a 5G network may be stored in the memory 130, and may be accessed by other components (e.g., the processor 120, the first communication processor 212, or the second communication processor 214).

Figure 3:
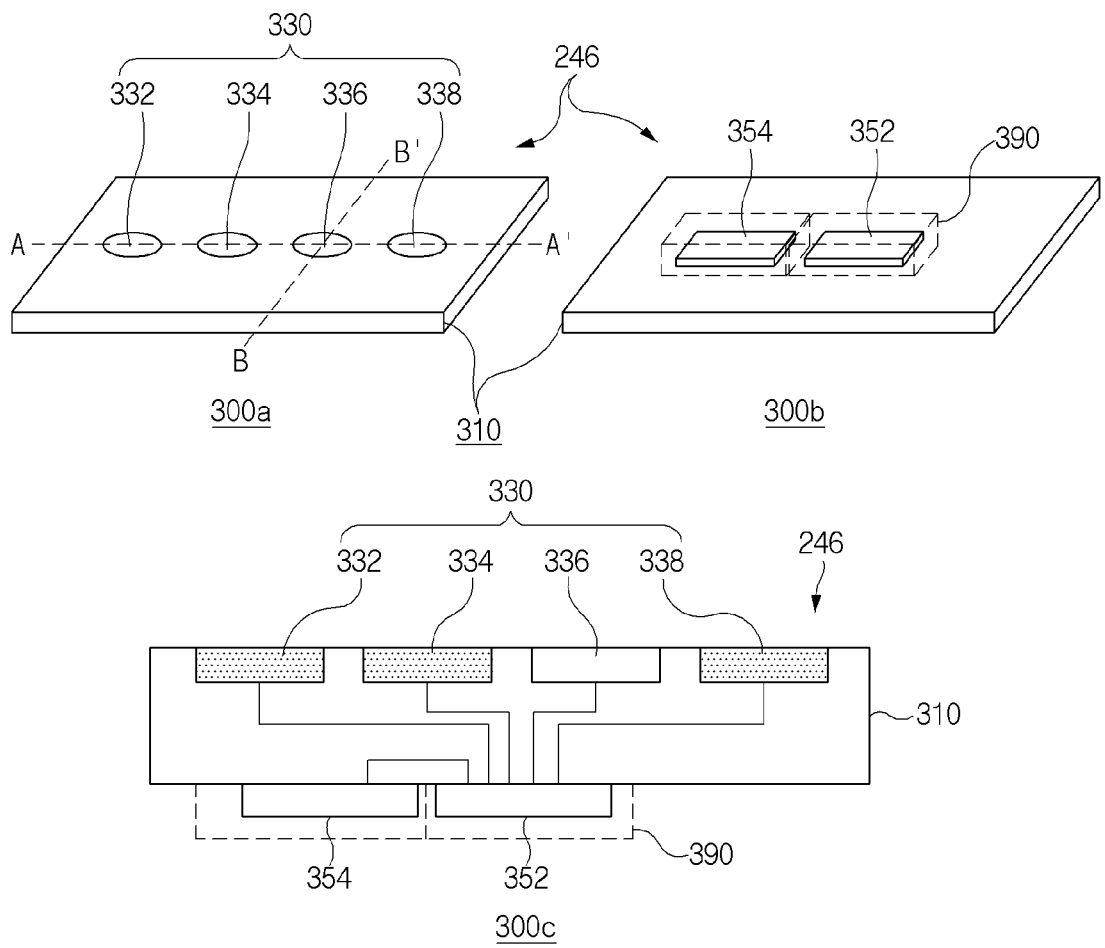
FIG. 3 illustrates, for example, an embodiment of a structure of a third antenna module described with reference to FIG. 2 according to an embodiment of the disclosure.

FIG. 3 illustrates, for example, an embodiment of a structure of a third antenna module described with reference to FIG. 2 according to an embodiment of the disclosure.

Panel 300a of FIG. 3 is a perspective view of the third antenna module 246 as viewed from one side, and panel 300b of FIG. 3 is a perspective view of the third antenna module 246 as viewed from another side. Panel 300c of FIG. 3 is a cross-sectional view of the third antenna module 246 taken along line A-A'.

Referring to FIG. 3, in an embodiment, the third antenna module 246 may include a printed circuit board 310, an antenna array 330, a radio frequency integrated circuit (RFIC) 352, a power manage integrate circuit (PMIC) 354, and a module interface (not shown). Optionally, the third antenna module 246 may further include a shielding member 390. In other embodiments, at least one of the above-mentioned components may not be provided, or at least two of the above-mentioned components may be integrated.

The printed circuit board 310 may include a plurality of conductive layers and a plurality of non-conductive layers stacked alternately with the conductive layers. The printed circuit board 310 may provide an electric connection between the printed circuit board 310 and/or externally arranged various electronic components using lines and conductive vias formed in the conductive layers.

The antenna array 330 (e.g., 248 of FIG. 2) may include a plurality of antenna elements 332, 334, 336, or 338 arranged to form a directional beam. The antenna elements may be formed on a first face of the printed circuit board 310 as illustrated in the figure. According to another embodiment, the antenna array 330 may be formed inside the printed circuit board 310. According to embodiments, the antenna array 330 may include a plurality of antenna arrays (e.g., a dipole antenna array and/or a patch antenna array) of the same shape or type or different shapes or types. According to various embodiments, the plurality of antenna elements 332, 334, 336, or 338 may be a plurality of conductive plates or a plurality of conductive members.

The RFIC 352 (e.g., the third RFIC 226 of FIG. 2) may be arranged in another region (e.g., a second face opposite to the first face) of the printed circuit board 310 spaced apart from the antenna array 330. The RFIC 352 may be configured to process a signal of a selected frequency band, which is transmitted/received through the antenna array 330. According to an embodiment, when performing transmission, the RFIC 352 may convert a baseband signal obtained from a communication processor (not shown) into an RF signal of a specified band. When performing reception, the RFIC 352 may convert an RF signal received via the antenna array 330 into a baseband signal and may transfer the baseband signal to the communication processor.

According to another embodiment, when performing transmission, the RFIC 352 may up-convert an IF signal (e.g., about 9 GHz to about 11 GHZ) obtained from an intermediate frequency integrate circuit (IFIC) (e.g., the fourth RFIC 228 of FIG. 2) into an RF signal of a selected band. When performing reception, the RFIC 352 downconverts an RF signal obtained via the antenna array 330 into an IF signal and may transfer the IF signal to the IFIC.

The PMIC 354 may be arranged in another partial region (e.g., the second face) of the printed circuit board 310 spaced apart from the antenna array. The PMIC 354 may be supplied with power from a main PCB (not shown) and may supply power to various components (e.g., the RFIC 352) on an antenna module.

The shielding member 390 may be arranged on a portion (e.g., the second face) of the printed circuit board 310 so as to electromagnetically shield at least one of the RFIC 352 or the PMIC 354. According to an embodiment, the shielding member 390 may include a shield can.

Although not illustrated, in various embodiments, the third antenna module 246 may be electrically connected to another printed circuit board (e.g., a main circuit board) via a module interface. The module interface may include a connection member, for example, a coaxial cable connector, a board-to-board connector, interposer, or a flexible printed circuit board (FPCB). At least one of the RFIC 352 or the PMIC 354 of the third antenna module 246 may be electrically connected to the printed circuit board via the connection member.

Figure 4:
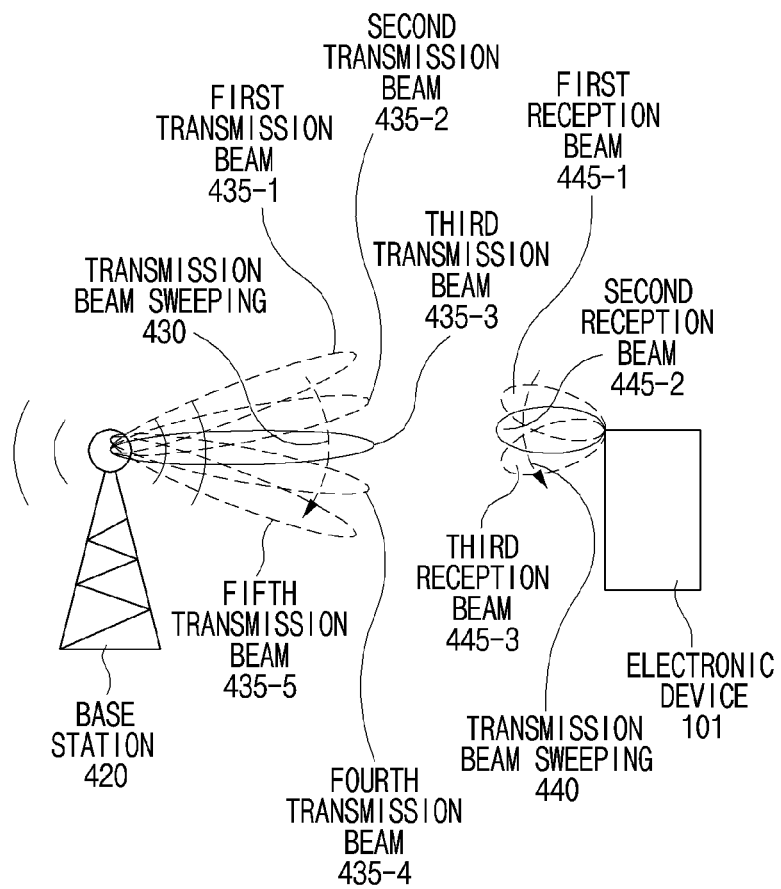
FIG. 4 illustrates an embodiment of an operation for wireless communication connection between a base station and an electronic device in the second network (e.g., 5G network) of FIG. 2, in which a directional beam is used for wireless connection according to an embodiment of the disclosure.

FIG. 4 illustrates an embodiment of an operation for wireless communication connection between a base station and an electronic device in the second cellular network (e.g., 5G network) of FIG. 2, in which a directional beam is used for wireless connection according to an embodiment of the disclosure.

Referring to FIG. 4, the base station (gNodeB (gNB), transmission reception point (TRP)) 420 may perform beam detection with the electronic device 101 for the wireless communication connection. In the illustrated embodiment, for the beam detection, the base station 420 may perform transmission beam sweeping 430 at least one time by sequentially transmitting a plurality of transmission beams, for example, first to fifth transmission beams 435-1, 435-2, 435-3, 435-4 and 435-5 having different directions.

The first to fifth transmission beams 435-1 to 435-5 may include at least one synchronization sequences (SS)/physical broadcast channel (PBCH) block. The SS/PBCH block may be used to periodically measure a channel of the electronic device 101 or beam intensity.

In another embodiment, the first to fifth transmission beams 435-1 to 435-5 may include at least one channel state information-reference signal (CSI-RS). The CSI-RS may be a criterion/reference signal that may be flexibly configured by the base station 420, and may be transmitted periodically, semi-persistently, or aperiodically. The electronic device 101 may measure a channel and beam intensity using the CSI-RS.

The transmission beams may form a radiation pattern having a selected beam width. For example, the transmission beams may have a broad radiation pattern having a first beam width or a sharp radiation pattern having a second beam width that is smaller than the first beam width. For example, transmission beams including an SS/PBCH block may have a broader radiation pattern than transmission beams including a CSI-RS.

The electronic device 101 may perform reception beam sweeping 440 while the base station 420 is performing the transmission beam sweeping 430. For example, while the base station 420 is performing first transmission beam 435-1 sweeping 430, the electronic device 101 may fix a first reception beam 445-1 in a first direction and may receive a signal of SS/PBCH block transmitted from at least one of the first to fifth transmission beams 435-1 to 435-5. While the base station 420 is performing second transmission beam 435-2 sweeping 430, the electronic device 101 may fix a second reception beam 445-2 in a second direction and may receive a signal of SS/PBCH block transmitted from the first to fifth transmission beams 435-1 to 435-5. As described above, the electronic device 101 may select a communicable reception beam (e.g., the second reception beam 445-2) and transmission beam (e.g., the third transmission beam 435-3) based on a result of signal reception operation through the reception beam sweeping 440. The electronic device 101 may also receive transmission of a signal on a third reception beam 445-3.

As described above, after the communicable transmission/reception beams are determined, the base station 420 and the electronic device 101 may transmit and/or receive pieces of basic information for configuring a cell and may configure additional information for beam operation based on the basic information. For example, the beam operation information includes detailed information about a configured beam and configuration information about an SS/PBCH block, CSI-RS, or additional reference signal.

Furthermore, the electronic device 101 may continuously monitor a channel and beam intensity using at least one of SS/PBCH block or CSI-RS included in a transmission beam. The electronic device 101 may adaptively select a beam with good quality using the above monitoring operation. Optionally, when communication is disconnected due to movement of the electronic device 101 or beam interruption, the above beam sweeping operation may be re-performed to determine a communicable beam.

Figure 5:
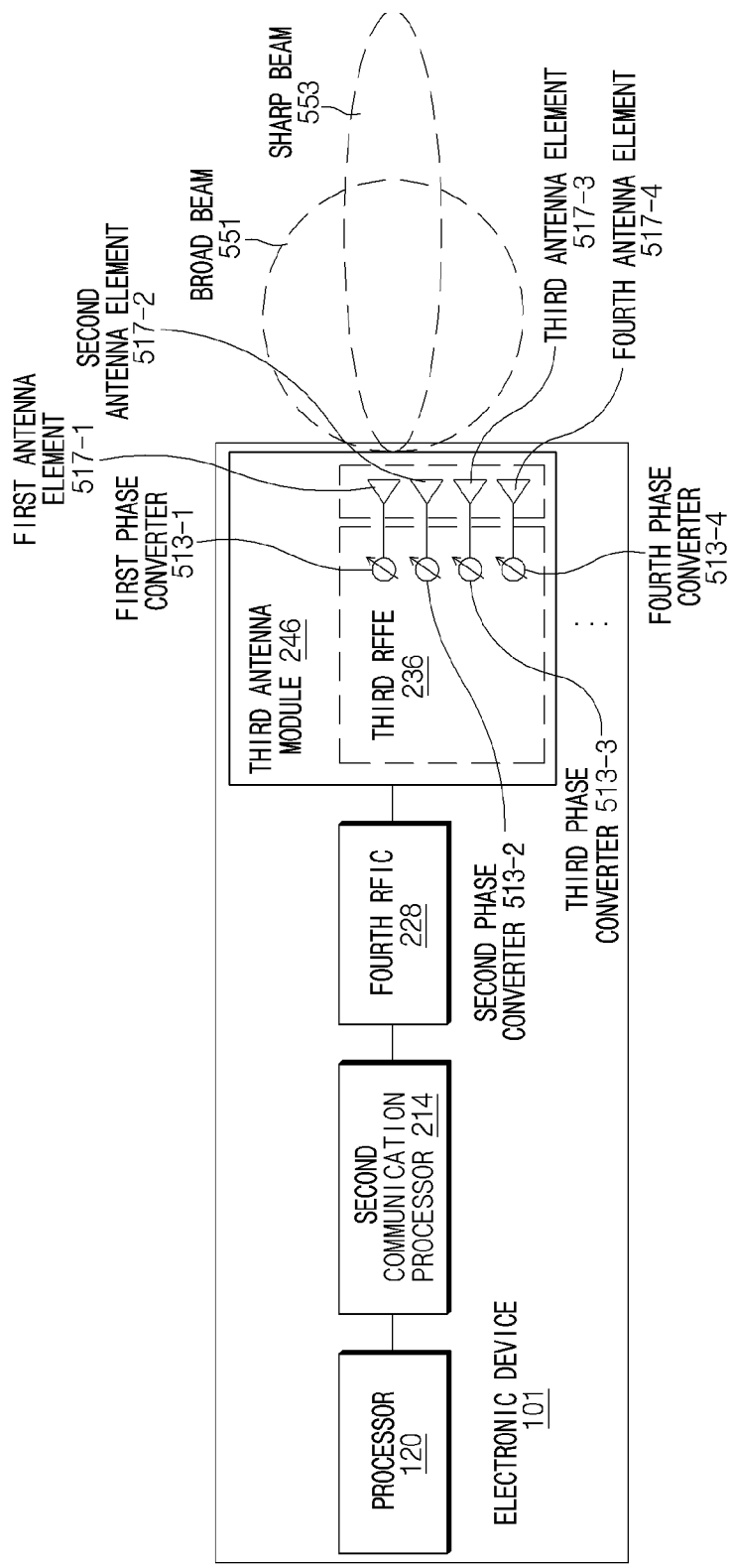
FIG. 5 is a block diagram illustrating an electronic device for 5G network communication according to an embodiment of the disclosure.

FIG. 5 is a block diagram illustrating an electronic device for 5G network communication according to an embodiment of the disclosure.

The electronic device 101 may include various components shown in FIG. 3, but, for concise description, FIG. 5 illustrates the electronic device 101 as including a processor 120, a second communication processor 214, a fourth RFIC 228, and at least one third antenna module 246.

Referring to FIG. 5, the third antenna module 246 may include first to fourth phase converters 513-1, 513-2, 513-3 and 513-4 (e.g., the phase converter 238 of FIG. 2) and/or first to fourth antenna elements 517-1, 517-2, 517-3 and 517-4 (e.g., the antenna 248 of FIG. 2). Each one of the first to fourth antenna elements 517-1 to 517-4 may be electrically connected to an individual one of the first to fourth phase converters 513-1 to 513-4. The first to fourth antenna elements 517-1 to 517-4 may form at least one antenna array.

The second communication processor 214 may control a phase of signals transmitted and/or received through the first to fourth antenna elements 517-1 to 517-4 by controlling the first to fourth phase converters 513-1 to 513-4, and may generate a transmission beam and/or reception beam in a direction selected accordingly.

According to an embodiment, the third antenna module 246 may generate a broad beam 551 having a broad radiation pattern (hereinafter referred to as a "broad beam") or a sharp beam 553 having a sharp radiation pattern (hereinafter referred to as a "sharp beam") according to the number of antenna elements used. For example, the third antenna module 246 may form the sharp beam 553 when using all of the first to fourth antenna elements 517-1 to 517-4, and may form the broad beam 551 when using only the first antenna element 517-1 and the second antenna element 517-2. The broad beam 551 has wider coverage than the sharp beam 553 but has a lower antenna gain, and thus may be more effective when performing a beam search. On the contrary, the sharp beam 553 has narrower coverage than the broad beam 551 but has a higher antenna gain, and thus may improve communication performance.

According to another embodiment, the second communication processor 214 may use the sensor module 176 (e.g., 9-axis sensor, grip sensor, or GPS) in a beam search. For example, the electronic device 101 uses the sensor module 176 to adjust a beam search position and/or beam search period based on a position and/or movement of the electronic device 101. For another example, when the electronic device 101 is gripped by a user, a grip sensor is used to detect a portion gripped by the user and select an antenna module having better communication performance among a plurality of third antenna modules 246.

Figure 6:
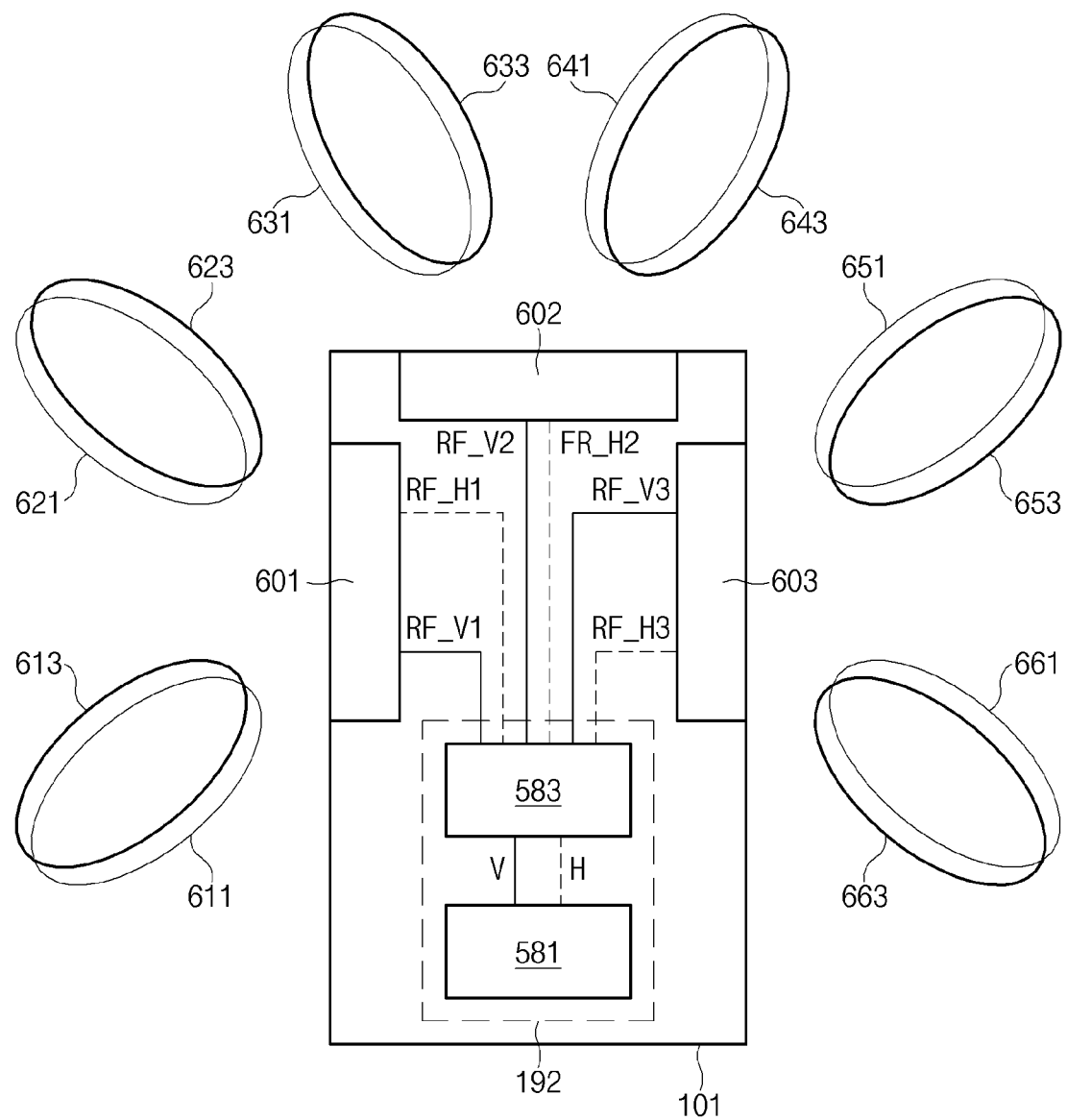
FIG. 6 is a block diagram illustrating an electronic device performing dual polarization beam forming according to an embodiment of the disclosure.

FIG. 6 is a block diagram illustrating an electronic device performing dual polarization beam forming according to an embodiment of the disclosure.

For convenience, it is assumed that the electronic device 101 includes three antenna modules in FIG. 6. However, for an electronic device including fewer than three antenna modules or more than three antenna modules, the proposed various embodiments may also be applied as they are or after simple design modification. Furthermore, although FIG. 6 illustrates that each antenna module forms beams in two directions, embodiments of the disclosure are not limited thereto. Each antenna module may form beams in two or more directions.

Referring to FIG. 6, the electronic device according to an embodiment may comprise a processor 581 (e.g., the second communication processor 214 of FIG. 2) or first to third antenna modules 601, 602, and 603 (e.g., the third antenna module 246 of FIG. 2) and a communication circuit 583 (e.g., the fourth RFIC 228 of FIG. 2).

According to an embodiment, in a transmission operation, the processor 581 may transfer, to one or more of the first to third antenna modules 601, 602, and 603 via the communication circuit 583, at least one baseband signal among first baseband signals V1, V2, and V3 to be transmitted through a vertically polarized wave and/or second baseband signals H1, H2, and H3 to be transmitted through a horizontally polarized wave. For example, the communication circuit 583 may up-convert a baseband signal received from the processor 581, and may transfer the converted baseband signal to one or more of the first to third antenna modules 601, 602, and 603. The first baseband signals V1, V2, and V3 and the second baseband signals H1, H2, and H3 may be the same information or different information.

According to another embodiment, in a reception operation, the processor 581 may receive a baseband signal from one or more of the first to third antenna modules 601, 602, and 603 via the communication circuit 583. For example, the communication circuit 583 down-converts a signal received from at least one of the first to third antenna modules 601, 602, and 603 into a baseband signal and may transfer the base band signal to the processor 581.

According to another embodiment, the first to third antenna modules 601, 602, and 603 may include an array antenna configured with a plurality of antenna elements. The array antenna may be a multi-polarization array antenna. The multi-polarization array antenna may be an array antenna capable of transmitting a signal based on multi-polarization characteristics. A dual polarization array antenna that is one type of the multi-polarization array antenna may support signal transmission/reception by orthogonal polarization such as a vertically polarized wave and horizontally polarized wave in one beam direction.

According to another embodiment, an antenna element included in the multi-polarization array antenna may be a patch-type antenna (hereinafter referred to as "patch antenna") element or a dipole-type antenna (hereinafter referred to as "dipole antenna") element. In the case where the multi-polarization array antenna includes a patch antenna element, a plurality of beams having different polarization characteristics in one beam direction are formed in pairs. For example, the dual polarization array antenna including a patch antenna element forms a beam using a vertical polarization characteristic and a beam using a horizontal polarization characteristic in pairs in one beam direction.

According to an embodiment, when performing a transmission operation, the communication circuit 583 may up-convert the first baseband signal V1 and/or second baseband signal H1 received from the processor 581 into an intermediate frequency signal, and may transfer the intermediate frequency signal to the first antenna module 601. The first antenna module 601 may transmit an up-converted radio frequency signal through at least one of a plurality of beams. According to an embodiment, when performing a reception operation, the first antenna module 601 may down-convert a radio frequency signal received through at least one of a plurality of beams, and may transfer the converted signal to the communication circuit 583. The communication circuit 583 may down-convert a signal received from the first antenna module 601 into the first base signal V1 and/or second baseband signal H1, and thereafter may transfer the converted signal to the processor 581. The plurality of beams may include, for example, a first vertical polarization beam 611 having a vertical polarization characteristic and a first horizontal polarization beam 613 having a horizontal polarization characteristic in a first beam direction and a second vertical polarization beam 621 having a vertical polarization characteristic and a second horizontal polarization beam 623 having a horizontal polarization characteristic in a second beam direction.

According to another embodiment, when performing a transmission operation, the communication circuit 583 may up-convert the first baseband signal V2 and/or second baseband signal H2 received from the processor 581 into an intermediate frequency signal, and may transfer the intermediate frequency signal to the second antenna module 602. The second antenna module 602 may up-convert the intermediate frequency signal into a radio frequency signal, and may transmit the radio frequency signal through at least one of a plurality of beams. According to an embodiment, when performing a reception operation, the second antenna module 602 may down-convert a radio frequency signal received through at least one of a plurality of beams into an intermediate frequency signal, and may transfer the intermediate frequency signal to the communication circuit 583. The communication circuit 583 may down-convert the intermediate frequency signal into the first baseband signal V2 and/or second baseband signal H2, and may transfer the converted signal to the processor 581. The plurality of beams may include, for example, a third vertical polarization beam 631 having a vertical polarization characteristic and a third horizontal polarization beam 633 having a horizontal polarization characteristic in a third beam direction and a fourth vertical polarization beam 641 having a vertical polarization characteristic and a fourth horizontal polarization beam 643 having a horizontal polarization characteristic in a fourth beam direction.

According to another embodiment, in a transmission operation, the communication circuit 583 may up-convert the first baseband signal V3 and/or second baseband signal H3 received from the processor 581 into an intermediate frequency signal, and may transfer the intermediate frequency signal to the third antenna module 603. The third antenna module 603 may up-convert the intermediate frequency signal into a radio frequency signal, and may transmit the radio frequency signal through at least one of an after plurality of beams. According to another embodiment, when performing a reception operation, the third antenna module 603 may down-convert a radio frequency signal received through at least one of a plurality of beams into an intermediate frequency signal, and may transfer the intermediate frequency signal to the communication circuit 583. The communication circuit 583 may down-convert the intermediate frequency signal into the first baseband signal V3 and/or second baseband signal H3, and may transfer the converted signal to the processor 581. The plurality of beams may include, for example, a fifth vertical polarization beam 651 having a vertical polarization characteristic and a fifth horizontal polarization beam 653 having a horizontal polarization characteristic in a fifth beam direction and a sixth vertical polarization beam 661 having a vertical polarization characteristic and a sixth horizontal polarization beam 663 having a horizontal polarization characteristic in a sixth beam direction.

According to another embodiment, each of the antenna modules 601, 602, and 603 may transmit/receive a wireless signal using a vertical polarization beam and a horizontal polarization beam substantially simultaneously. Since two polarized waves are orthogonal to each other, the electronic device 101 may increase data throughput or data safety using polarization diversity.

FIG. 6 illustrates the communication circuit 583, but the communication circuit 583 may not be provided. For example, the processor 581 is directly connected to each of the antenna modules 601, 602, and 603. Each of the antenna modules 601, 602, and 603 may be configured to perform the above-mentioned operations of the communication circuit 583.

Figure 7:
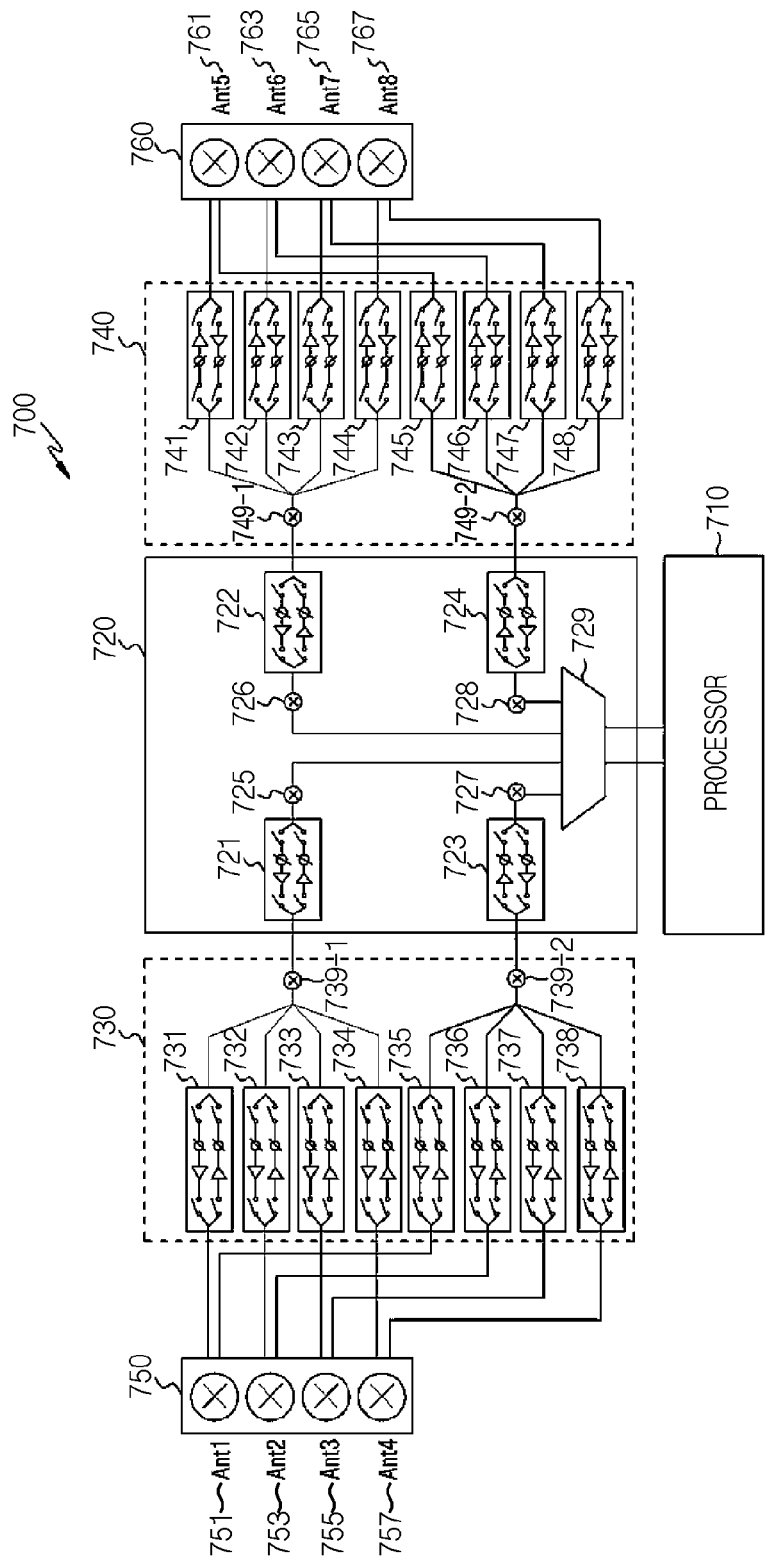
FIG. 7 illustrates a multi-polarization array antenna connection structure of an electronic device according to an embodiment of the disclosure.

FIG. 7 is a diagram illustrating a structure in which a beam is activated based on a multi-polarization array antenna in an electronic device according to an embodiment of the disclosure.

Although FIG. 7 illustrates the electronic device 101 as including two antenna modules, it would be merely a matter of simple design modification for a person skilled in the art to apply the proposed structure for beam activation to an antenna module to be added to the electronic device 101.

Referring to FIG. 7, an electronic device 700 according to an embodiment may include all or portion of a processor 710 (e.g., the processor 581 of FIG. 6), a communication circuit 720 (e.g., the communication circuit 583 of FIG. 6), a first RFIC 730, a second RFIC 740, a first multi-polarization array antenna 750, and a second multi-polarization array antenna 760.

According to an embodiment, four antenna elements 751, 753, 755, and 757 (Ant1 to Ant4) included in the first multi-polarization array antenna 750 may be electrically connected to four ports provided to the first RFIC 730 for first polarization and four ports provided for second polarization. Each of the four antenna elements 751, 753, 755, and 757 (Ant1 to Ant4), for example, may be electrically connected to one port provided for first polarization and one port provided for second polarization.

According to another embodiment, the first antenna element 751 (Ant1) included in the first multi-polarization array antenna 750, for example, is electrically connected to a first transmission/reception circuit 731 for transmission and reception of first polarization and a fifth transmission/reception circuit 735 for transmission/reception of second polarization included in the first RFIC 730. The second antenna element 753 (Ant2) included in the first multi-polarization array antenna 750, for example, may be electrically connected to a second transmission/reception circuit 732 for transmission and reception of first polarization and a sixth transmission/reception circuit 736 for transmission/reception of second polarization included in the first RFIC 730. The third antenna element (Ant3) included in the first multi-polarization array antenna 750, for example, may be electrically connected to a third transmission/reception circuit 733 for transmission and reception of first polarization and a seventh transmission/reception circuit 737 for transmission/reception of second polarization included in the first RFIC 730. The fourth antenna element (Ant4) included in the first multi-polarization array antenna 750, for example, is electrically connected to a fourth transmission/reception circuit 734 for transmission and reception of first polarization and an eighth transmission/reception circuit 738 for transmission/reception of second polarization included in the first RFIC 730.

According to another embodiment, the first to fourth transmission/reception circuits 731, 732, 733, and 734 included in the first RFIC 730 for transmission and reception of first polarization may include switches that form a path to electrically connect a first mixer 739-1, which performs frequency up-conversion and frequency down-conversion for first polarization according to a beam to be used, to at least one of the first to fourth antenna elements 751, 753, 755, and 757 (Ant1 to Ant4) included in the first multi-polarization array antenna 750.

According to another embodiment, the fifth to eighth transmission/reception circuits 735, 736, 737, and 738 included in the first RFIC 730 for transmission and reception of first polarization may include switches that form a path to electrically connect a second mixer 739-2, which performs frequency up-conversion and frequency down-conversion for second polarization according to a beam to be used, to at least one of the first to fourth antenna elements 751, 753, 755, and 757 (Ant1 to Ant4) included in the first multi-polarization array antenna 750.

According to another embodiment, four antenna elements 761, 763, 765, and 767 (Ant5 to Ant8) included in the second multi-polarization array antenna 760 may be electrically connected to four ports provided to the second RFIC 740 for first polarization. Each of the four antenna elements 761, 763, 765, and 767 (Ant5 to Ant8), for example, may be electrically connected to one port provided for first polarization and one port provided for second polarization.

According to another embodiment, the fifth antenna element 761 (Ant5) included in the second multi-polarization array antenna 760, for example, is electrically connected to a first transmission/reception circuit 741 for transmission and reception of first polarization and a fifth transmission/reception circuit 745 for transmission/reception of second polarization included in the second RFIC 740. The sixth antenna element 763 (Ant6) included in the second multi-polarization array antenna 760, for example, is electrically connected to a second transmission/reception circuit 742 for transmission and reception of first polarization and a sixth transmission/reception circuit 746 for transmission/reception of second polarization included in the second RFIC 740. The seventh antenna element 765 (Ant7) included in the second multi-polarization array antenna 760, for example, is electrically connected to a third transmission/reception circuit 743 for transmission and reception of first polarization and a seventh transmission/reception circuit 747 for transmission/reception of second polarization included in the second RFIC 740. The eighth antenna element 767 (Ant8) included in the second multi-polarization array antenna 760, for example, is electrically connected to a fourth transmission/reception circuit 744 for transmission and reception of first polarization and an eighth transmission/reception circuit 748 for transmission/reception of second polarization included in the second RFIC 740.

According to another embodiment, the first to fourth transmission/reception circuits 741, 742, 743, and 744 included in the second RFIC 740 for transmission and reception of first polarization may include switches that form a path to electrically connect a third mixer 749-1, which performs frequency up-conversion and frequency down-conversion for second polarization according to a beam to be used, to at least one of the first to fourth antenna elements 761, 763, 765, and 767 (Ant5 to Ant8) included in the second multi-polarization array antenna 760.

According to another embodiment, the fifth to eighth transmission/reception circuits 745, 746, 747, and 748 included in the second RFIC 740 for transmission and reception of second polarization may include switches that form a path to electrically connect a fourth mixer 749-2, which performs frequency up-conversion and frequency down-conversion for second polarization according to a beam to be used, to at least one of the first to fourth antenna elements 761, 763, 765, and 767 (Ant5 to Ant8) included in the second multi-polarization array antenna 760.

According to another embodiment, the communication circuit 720 may include four path connection circuits 721, 722, 723, and 724, fifth to eighth mixers 725, 726, 727, 728, or a multiplexer and demultiplexer 729. The four path connection circuits 721, 722, 723, and 724, for example, may electrically connect the fifth to eighth mixers 725, 726, 727, 728 to the first RFIC 730 or the second RFIC 740.

According to an embodiment, the first path connection circuit 721 may electrically connect the fifth mixer 725 with the first mixer 739-1 included in the first RFIC 730, a second path connection circuit 722 may electrically connect the sixth mixer 726 with the third mixer 749-1 included in the second RFIC 740, a third path connection circuit 723 may electrically connect the seventh mixer 727 with the second mixer 739-2 included in the first RFIC 730, and the fourth path connection circuit 724 may electrically connect the eighth mixer 728 with the fourth mixer 749-2 included in the second RFIC 740.

In FIG. 7, the demultiplexer 729 may electrically connect at least two of the four path connection circuits 721, 722, 723, and 724 to the processor 710. For example, the demultiplexer 729 is connected, to the processor 710, two path connection circuits (e.g., the first path connection circuit 721 and the third path connection circuit 723) corresponding to different polarization for the same antenna array (e.g., the first multi-polarization array antenna 750). For another example, the demultiplexer 729 is connected, to the processor 710, respective path connection circuits (e.g., the first path connection circuit 721 and the second path connection circuit 722) of two antenna arrays (e.g., the first multi-polarization array antenna 750 and the second multi-polarization array antenna 760).

Although FIG. 7 illustrates that two path connection circuits are connected to the processor 710 via the demultiplexer 729, embodiments of the disclosure are not limited thereto. For example, the demultiplexer 729 is not provided. In this case, the four path connection circuits 721, 722, 723, and 724 all may be connected to the processor 710. The processor 710 may transmit/receive a signal using at least one of the four path connection circuits 721, 722, 723, and 724.

Various example configurations of the electronic device 101 have been described with reference to FIGS. 1 to 7. The electronic device 101 of the disclosure may include any combination of the configurations of the electronic device 101 described above in relation to FIGS. 1 to 7. The operations of the electronic device 101 described below with reference to FIGS. 8 to 20 may be performed by at least one of the above-mentioned configurations of the electronic device 101.

Figure 8:
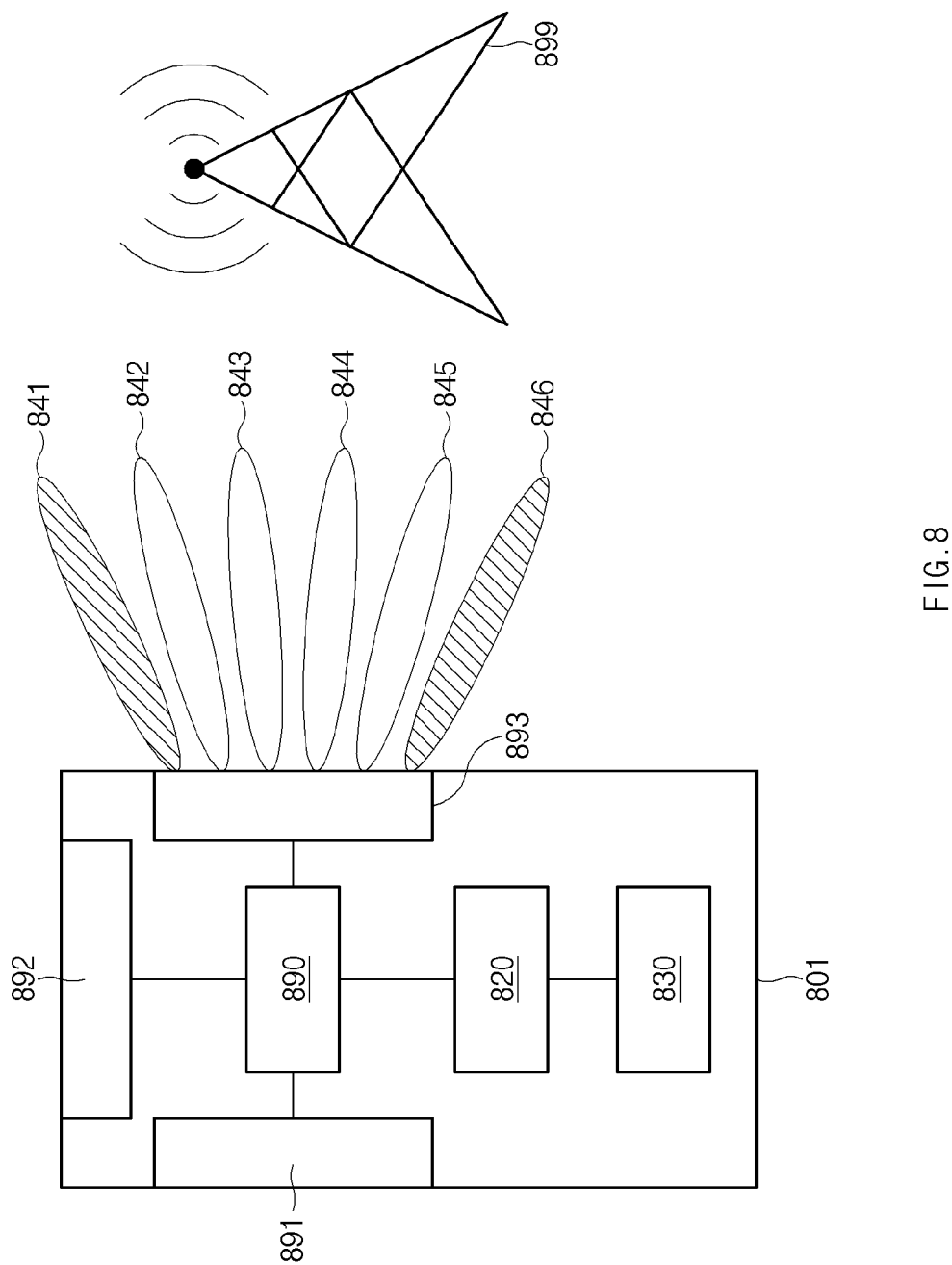
FIG. 8 illustrates multi-beam transmission using one antenna module according to an embodiment of the disclosure.

FIG. 8 illustrates multi-beam transmission using one antenna module according to an embodiment of the disclosure.

Referring to FIG. 8, an electronic device 801 (e.g., the electronic device 101 of FIGS. 1 to 7) may include at least one antenna module (e.g., the third antenna module of FIG. 5, the first to third antenna module 601, 602, and 603 of FIG. 6), a communication circuit 890 (e.g., the fourth RFIC 228 of FIG. 5, the communication circuit 583 of FIG. 6, or the communication circuit 720 of FIG. 7) operatively connected to the at least one antenna module, a processor 820 (e.g., the second communication processor 214 of FIG. 5 and/or the processor 581 of FIG. 6) operatively connected to the communication circuit 890, and/or a memory 830 (e.g., the memory 130 of FIG. 1) operatively connected to the processor 820. The configuration of the electronic device 801 of FIG. 8 is illustrative, and embodiments of the disclosure are not limited thereto. For example, the memory 830 may not be provided or may be implemented integrally with the processor 820. For example, the communication circuit 890 may not be provided. In this case, at least portion of operations of the communication circuit 890 may be performed by at least one antenna modules 891, 892, and 893.

For example, the electronic device 801 includes a first antenna module 891, a second antenna module 892, and a third antenna module 893. Each of the antenna modules 891, 892, and 893 may include at least one array antenna (e.g., the antenna array 515 of FIG. 5). The at least one array antenna may include a plurality of antenna elements, wherein the plurality of antenna elements may be arranged at specified intervals so as to perform beamforming. Each of the antenna elements may be referred to as a conductive radiator or conductive plate. As described above with reference to FIG. 7, each antenna element may be connected to two feeding points for dual polarization. Each of the antenna modules 891, 892, and 893 may up-convert an intermediate frequency signal received from the communication circuit 890 into a radio frequency signal and may transmit (e.g., radiate) the radio frequency signal. Each of the antenna modules 891, 892, and 893 may down-convert a radio frequency signal received from the outside (e.g., base station) into an intermediate frequency signal and may transfer the intermediate frequency signal to the communication circuit 890. Each of the at least one antenna modules 891, 892, and 893 may include at least one amplifier for amplifying a signal and/or at least one phase shifter for changing a phase of a signal. The at least one antenna modules 891, 892, and 893 may be referred to as a means for beamforming. The means for beamforming may include an antenna device including any antenna capable of performing beamforming, such as the at least one antenna modules 891, 892, and 893.

For example, the communication circuit 890 may process a signal received from the at least one antenna modules 891, 892, and 893 or the processor 820, and may control an electric path between the at least one antenna modules 891, 892, and 893 and the processor 820. The communication circuit 890 may up-convert a baseband signal (e.g., vertical polarization signal and/or horizontal polarization signal) received from the processor 820 into an intermediate frequency signal, and may transfer the intermediate frequency signal to the at least one antenna modules 891, 892, and 893. The communication circuit 890 may receive an intermediate frequency signal from the at least one antenna modules 891, 892, and 893, may down-convert the intermediate frequency signal into a baseband signal, and may transfer the baseband signal to the processor 820. The communication circuit 890 may include at least one amplifier for amplifying a signal and/or at least one phase shifter for changing a phase of a signal. The communication circuit 890 may be referred to as a means for frequency conversion. The means for frequency conversion may include a device including any RF component capable of performing frequency conversion.

For example, the processor 820 processes a baseband signal. The processor 820 may modulate and/or demodulate a signal. For example, the processor 820 may be controlled by instructions stored in the memory 830. Operation of the processor 820 may be referred to as operation of the electronic device 801. The processor 820 may be referred to as a means for signal processing. The means for signal processing may include, for example, any electronic component configured to perform digital and/or analog processing of a signal.

According to another embodiment, the processor 820 may perform beamforming using the at least one antenna modules 891, 892, and 893. The processor 820 may transmit and/or receive a wireless signal using a beam formed by beamforming. Here, the wireless signal may include a multi-band signal (e.g., band adjacent to 28 GHz and band adjacent to 39 GHz) and/or a multi-polarization signal (e.g., vertically polarized wave and horizontally polarized wave).

Referring to FIG. 8, for example, the third antenna module 893 is configured to form six beams 841, 842, 843, 844, 845, and 846. The processor 820 may obtain, from a beam table stored in the memory 830, information for generating a beam for communicating with a first base station 899 (e.g., gNB). For example, the beam table includes a beam index and beamforming information (e.g., antenna module, polarization, and/or phase information) mapped to the index.

Referring to FIG. 8, the processor 820 may communicate with the first base station 899 using a 3-1st beam 841 and 3-6th beam 846. For example, the processor 820 transmits at least one wireless signal to the first base station 899 using the 3-1st beam 841 and 3-6th beam 846. For example, the 3-1st beam 841 corresponds to a line of sight (LoS) between the electronic device 801 and the first base station 899, and the 3-6th beam 846 may correspond to a wireless path, formed by signal reflection, between the first base station 899 and the electronic device 801.

The processor 820 may form beams so that two beams have different frequency bands. For example, the processor 820 may differently configure frequency bands of the 3-1st beam 841 and 3-6th beam 846. In an example, the 3-1st beam 841 may be used in transmitting/receiving a signal of a first frequency band (e.g., band adjacent to 39 GHZ), and the 3-6th beam 846 may be used in transmitting/receiving a signal of a second frequency band (e.g., band adjacent to 28 GHz).

The processor 820 may form beams so that two beams have a characteristic of being orthogonal to each other. For example, the processor 820 differently configures polarization of the 3-1st beam 841 and 3-6th beam 846. The 3-1st beam 841 may correspond to a horizontally polarized wave, and the 3-6th beam 846 may correspond to a vertically polarized wave. For example, the processor 820 configures the frequency bands of the 3-1st beam 841 and 3-6th beam 846 as the same frequency band or adjacent frequency band.

The processor 820 may differently configure the frequency bands and polarization of the 3-1st beam 841 and 3-6th beam 846.

Referring to FIG. 8, a first signal using the 3-1st beam 841 may be associated with a first cell (e.g., Primary cell) of the first base station 899, and a second signal using the 3-6th beam 846 may be associated with a second cell (e.g., Secondary cell) of the first base station 899.

According to another embodiment, the processor 820 may increase a data transmission amount using spatial multiplexing that is based on multi-beam transmission. For example, the processor 820 performs carrier aggregation (CA) through multi-beam transmission. The processor 820 may increase a bandwidth of a wireless signal by performing carrier aggregation using the first frequency band of the 3-1 st beam 841 and the second frequency band of the 3-6th beam 846. For example, the processor 820 transmits the first signal including first data to the first base station 899 using the 3-1st beam 841, and transmits the second signal including second data different from the first data to the first base station 899 using the 3-6th beam 846. The first frequency band of the 3-1st beam 841 and the second frequency band of the 3-6th beam 846 may be different frequency bands.

According to another embodiment, the processor 820 may reduce a data transmission error using spatial diversity that is based on multi-beam transmission. For example, the processor 820 performs a Multiple-Input Multiple-Output (MIMO) operation through multi-beam transmission. The processor 820 may transmit the first signal including the first data to the first base station 899 using the 3-1st beam 841, and may transmit the second signal including the first data to the first base station 899 using the 3-6th beam 846. The first base station 899 may increase a decoding success rate of a received signal by combining the first signal and the second signal. Although FIG. 8 illustrates that the electronic device 801 performs a MIMO operation with respect to the first base station 899, embodiments of the disclosure are not limited thereto. For example, as described below with reference to FIG. 9, the electronic device 801 performs a MIMO operation with respect to a plurality of base stations (e.g., the first base station 899 and a second base station 999). For example, the electronic device 801 performs a MIMO operation by forming a plurality of beams using one antenna module and transmitting a signal to a plurality of base stations using the plurality of beams.

Hereinafter, descriptions of the same reference numbers may refer to the above descriptions provided with reference to FIG. 8 unless otherwise described.

Figure 9:
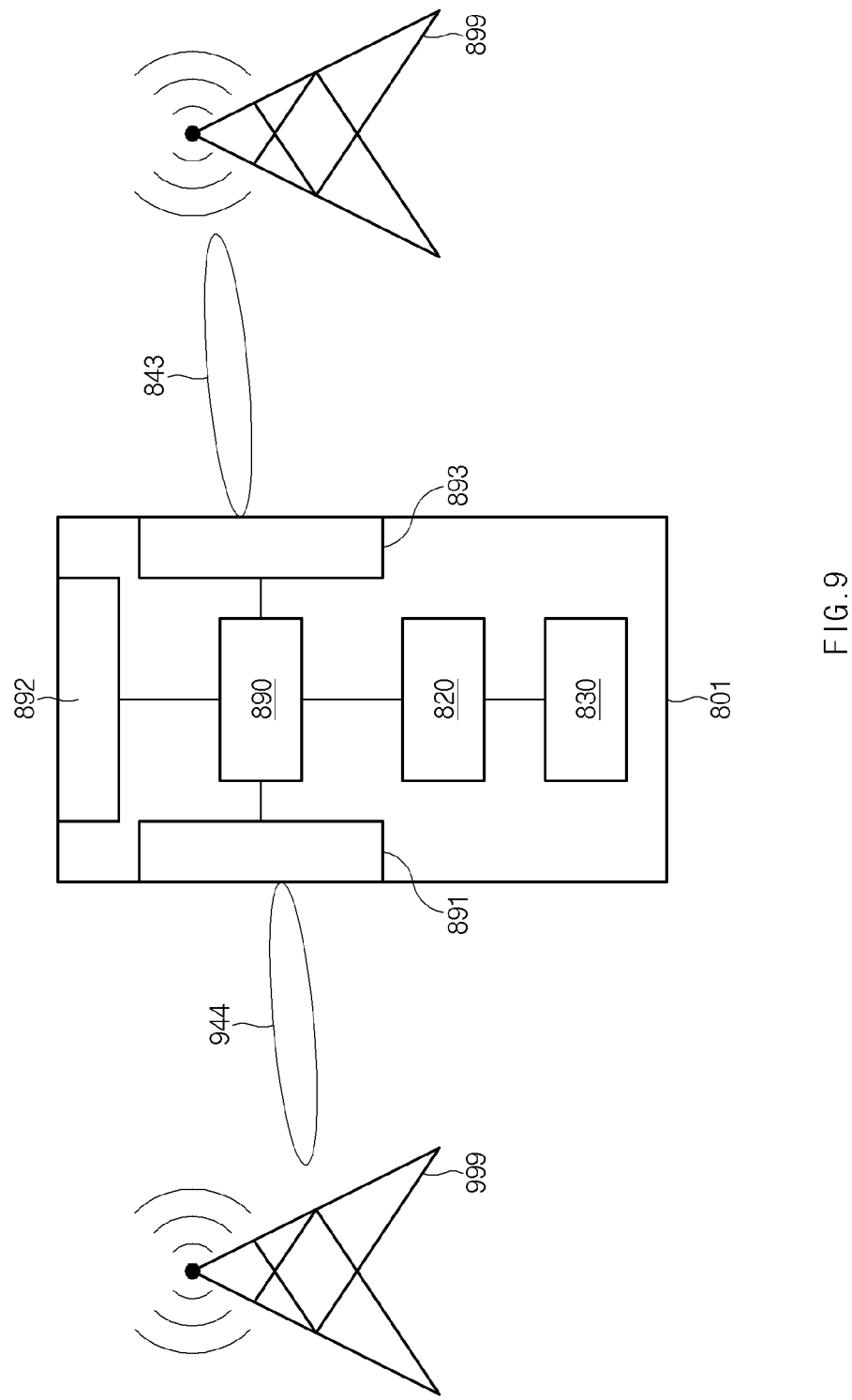
FIG. 9 illustrates multi-beam transmission using a plurality of antenna modules according to an embodiment of the disclosure.

FIG. 9 illustrates multi-beam transmission using a plurality of antenna modules according to an embodiment of the disclosure.

Referring to FIG. 9, the processor 820 may communicate with the first base station 899 using a 3-3rd beam 843 and may communicate with the second base station 999 using a first beam 944. For example, the processor 820 transmits a first signal to the first base station 899 using the 3-3rd beam 843, and transmits a second signal to the second base station 999 using the first beam 944. The processor 820 may form the first beam 944 using the first antenna module 891, and may form the 3-3rd beam 843 using the third antenna module 893. For example, the processor 820 transmits/receives a signal of a first frequency band (e.g., band adjacent to 39 GHz) using the first beam 944, and may transmit/receive a signal of a second frequency band (e.g., band adjacent to 39 GHz) using the 3-3rd beam 843. For example, the processor 820 may configure the frequency bands of the first beam 944 and 3-3rd beam 843 as adjacent frequency band (e.g., 28.2 GHz and 28.4 GHz). For example, the processor 820 may differently configure polarization of the first beam 944 and 3-3rd beam 843.

Referring to FIG. 9, the first beam 944 may be associated with a second cell of the second base station 999, and the 3-3rd beam 843 may be associated with a first cell of the first base station 899. For example, the first cell may be P-Cell associated with the electronic device 801, and the second cell may be S-Cell associated with the electronic device 801.

According to another embodiment, the processor 820 may increase a data transmission amount using spatial multiplexing that is based on multi-beam transmission. The processor 820 may transmit a first signal of the first frequency band using the first beam 944, and may transmit a second signal of the second frequency band using the 3-3rd beam 843. For example, the first base station 899 and the second base station 999 increase data throughput from the electronic device 801 by exchanging data using an inter-base station connection (e.g., backhaul link).

According to another embodiment, the processor 820 may reduce a data transmission error using spatial diversity that is based on multi-beam transmission. For example, the processor 820 transmits the first signal including first data to the second base station 999 using the first beam 944, and may transmit the second signal including the first data to the first base station 899 using the 3-3rd beam 843.

With regard to the example of FIG. 9, it has been described that the processor 820 communicates with the first base station 899 using the 3-3rd beam 843 and communicates with the second base station 999 using the first beam 944, but embodiments of the disclosure are not limited thereto. For example, the processor 820 communicates with the first base station 899 using the first beam 944 and the 3-3rd beam 843. For example, the 3-3rd beam 843 corresponds to a line of sight (LoS) between the first base station 899 and the electronic device 801, and the first beam 944 may correspond to a propagation path, caused by an arbitrary reflector, between the electronic device 801 and the first base station 899. According to another embodiment, the processor 820 may perform carrier aggregation with the first base station 899 using the first beam 944 and the 3-3rd beam 843. The 3-3rd beam 843 may be associated with P-Cell of the first base station 899, and the first beam 944 may be associated with S-Cell of the first base station 899. According to another embodiment, the processor 820 may perform a MIMO operation, orthogonal polarization transmission, or spatial multiplexing with the first base station 899 using the first beam 944 and the 3-3rd beam 843. In this case, the first beam 944 and the 3-3rd beam 843 may be associated with the same cell.

Figure 10:
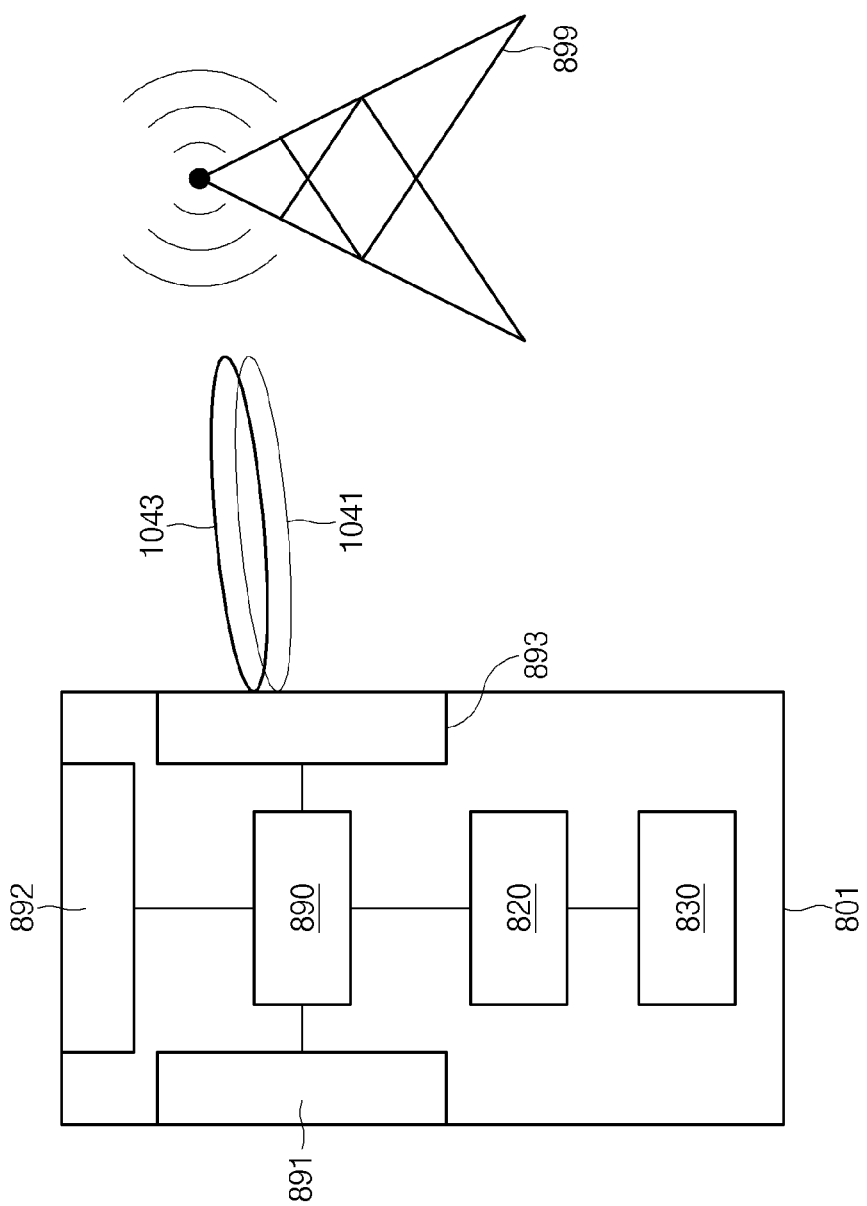
FIG. 10 illustrates multi-beam transmission based on multi-polarization according to an embodiment of the disclosure.

FIG. 10 illustrates multi-beam transmission based on multi-polarization according to an embodiment of the disclosure.

Referring to FIG. 10, the processor 820 may communicate with the first base station 899 using a first beam 1041 and a second beam 1043. For example, the processor 820 transmits a first signal to the first base station 899 using the first beam 1041, and may transmit a second signal to the first base station 899 using the second beam 1043. In the example of FIG. 10, the first beam 1041 and the second beam 1043 may be beams formed in the same direction and having different polarization. As described above with reference to FIGS. 8 and 9, the processor 820 may achieve spatial multiplexing or spatial diversity using two beams 1041 and 1043.

Various examples of multi-beam transmission of the electronic device 801 have been described with reference to FIGS. 8 to 10. The electronic device 801 may control transmission power based on equivalent isotropic radiated power (EIRP). In the case of the multi-beam transmission of FIG. 9, transmission beams of the electronic device 801 are oriented in different directions, an effect of multi-beam transmission on a human body may be similar to that of single-beam transmission. However, in the case of the multi-beam transmission of FIGS. 8 and 10, the EIRP may increase since multi-beams are oriented in similar directions. For example, the electronic device 801 makes power density due to transmission of a wireless signal satisfy a reference regulation by controlling transmission power according to various methods that will be described later with reference to FIGS. 11 to 16. When performing multi-beam transmission, the electronic device 801 may reduce power compared to single-beam transmission if multiple beams are oriented in the same direction. For example, the electronic device 801 performs (additional) power backoff compared to single beam if multi-beam transmission is oriented in the same direction.

Figure 11:
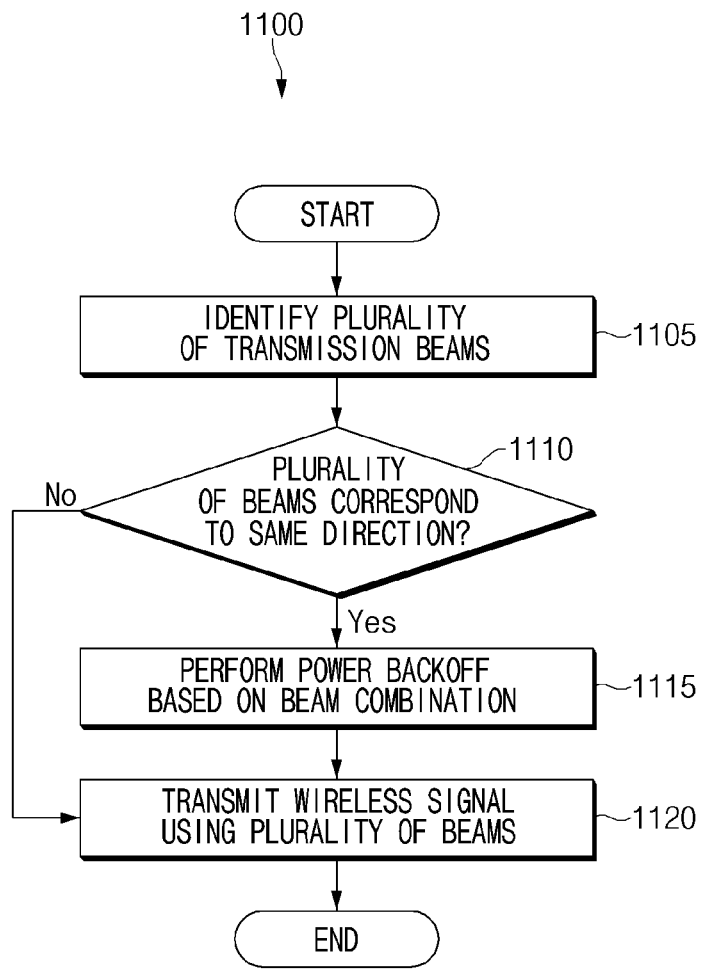
FIG. 11 is a flowchart illustrating a wireless signal transmission method according to an embodiment of the disclosure.

FIG. 11 is a flowchart illustrating a wireless signal transmission method according to an embodiment of the disclosure.

Referring to FIG. 11, in a method 1100, in operation 1105, the electronic device 801 may identify a plurality of transmission beams. For example, the electronic device 801 may identify a plurality of transmission beams for communicating with at least one base station through the beam sweeping described above with reference to FIG. 4. For example, the electronic device 801 may identify a plurality of transmission beams upon receiving information indicating uplink transmission using a plurality of transmission beams from the base station.

In operation 1110, the electronic device 801 may determine whether the plurality of beams correspond to the same direction. For example, the electronic device 801 determines whether the plurality of identified beams correspond to a beam combination specified in a memory. The memory of the electronic device 801 may store information about a beam combination (e.g., beam index combination) corresponding to the same direction. The electronic device 801 may determine whether the plurality of identified beams correspond to the same direction by comparing index information of the plurality of identified beams and the information about a beam combination. The beam combination identification method of the electronic device 801 is illustrative, and embodiments of the disclosure are not limited thereto. In addition, the meaning of "beams corresponding to the same direction" may be defined based on a direction in which a beam is formed (e.g., main lobe of a beam) with respect to the electronic device 801. The meaning of "beams corresponding to the same direction" may be described in detail with reference to FIG. 12.

When the plurality of beams correspond to the same direction (e.g., operation 1110—Yes), the electronic device 801 may perform power backoff based on the beam combination in operation 1115. For example, the electronic device 801 may perform relative power backoff compared to single-beam transmission. In operation 1120, the electronic device 801 may transmit a wireless signal using the plurality of beams. In a case that the plurality of beams correspond to the same direction, the electronic device 801 may transmit a signal based on maximum transmission power (e.g., transmission power on which power backoff has been performed) that is lower than set maximum transmission power compared to single-beam transmission. For example, transmission power set for the plurality of beams is determined within a range of maximum transmission power to which power backoff is applied. On the contrary, in the case of single-beam transmission, transmission power is determined within maximum transmission power that is higher compared to multi-beam transmission.

For example, maximum transmission power for single-beam transmission is set to first transmission power. When other power backoff is not performed, the electronic device 801 may apply power backoff for multi-beam transmission to the first transmission power (e.g., operation 1115) to set second transmission power that is lower than the first transmission power as maximum transmission power for multi-beam transmission.

According to another embodiment, the electronic device 801 may perform power backoff on maximum transmission power based on a specified condition (e.g., detection of an adjacent user or detection of a user adjacent to a beam direction). In this case, the electronic device 801 may set the maximum transmission power for single-beam transmission to third transmission power (e.g., power lower than the first transmission power). When the specified condition is satisfied, the electronic device 801 may apply power backoff for multi-beam transmission to the third transmission power (e.g., operation 1115) to set fifth transmission power that is lower than the third transmission power as the maximum transmission power for multi-beam transmission.

In the disclosure, the power backoff for multi-beam transmission may be combined with another type of backoff that may be performed by the electronic device 801, and may be referred to as relative or additional backoff for single-beam transmission. Embodiments of the disclosure do not exclude another type of backoff (e.g., backoff based on detection of an adjacent object) for transmission power.

Descriptions of transmission of a wireless signal using a plurality of beams may refer to the above descriptions provided with reference to FIGS. 8 to 10. In the disclosure, backoff in multi-beam transmission may be referred to as transmission power backoff relative to maximum transmission power for single-beam transmission. With regard to backoff of transmission power for the plurality of beams corresponding to the same direction, the following descriptions related to FIGS. 14 and 15 may be referenced.

When the plurality of beams do not correspond to the same direction (e.g., operation 1110—No), the electronic device 801 may transmit a wireless signal using the plurality of beams. For example, the electronic device 801 may set transmission power of each of the plurality of beams within a range of maximum transmission power that is substantially the same as the maximum transmission power set for single-beam transmission. Descriptions of transmission of a wireless signal using a plurality of beams may refer to the above descriptions provided with reference to FIGS. 8 to 10. With regard to signal transmission using a plurality of beams not corresponding to the same direction, the following descriptions related to FIG. 13 may be referenced.

Figure 12:
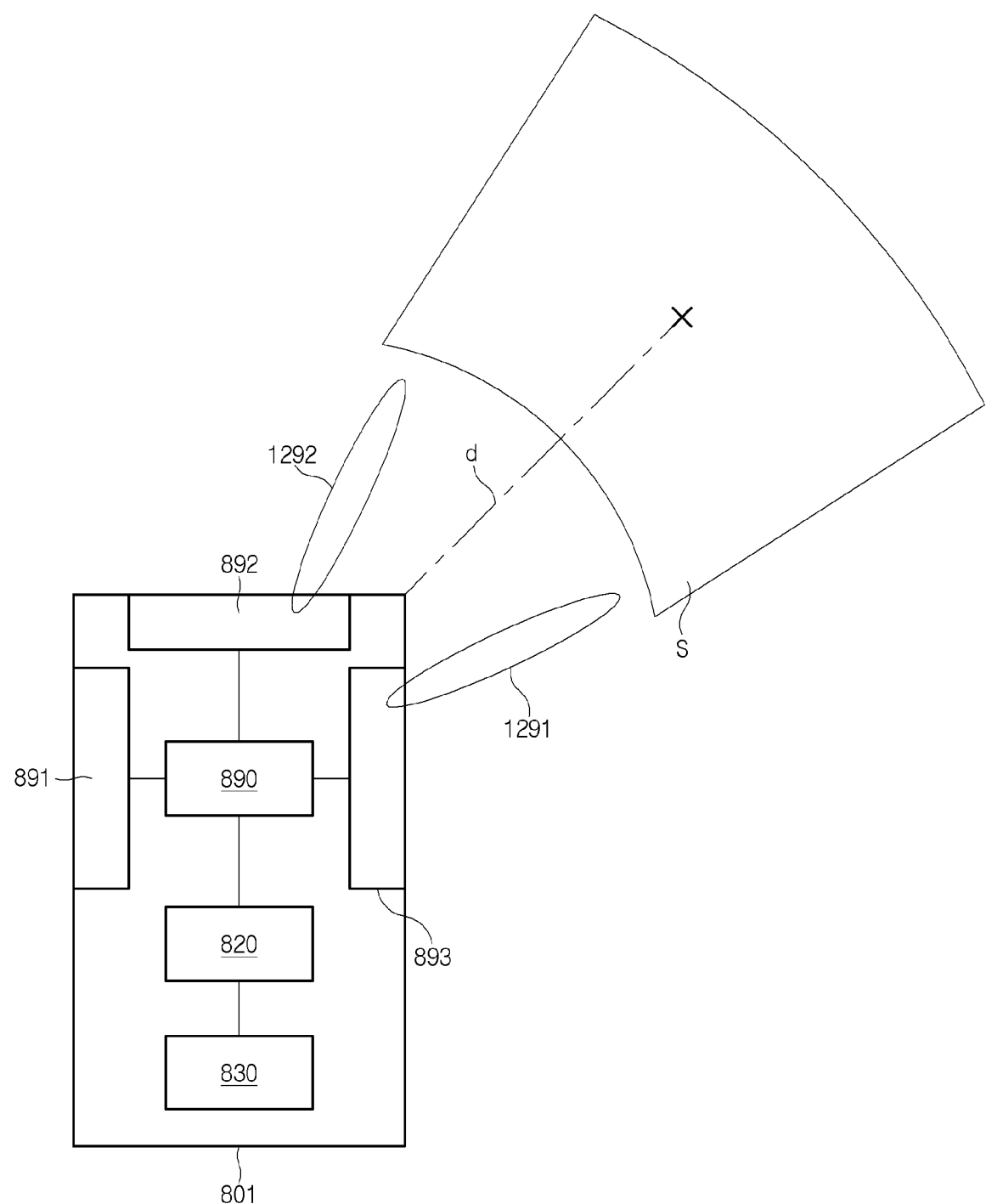
FIG. 12 illustrates a plurality of beams corresponding to the same direction according to an embodiment of the disclosure.

FIG. 12 illustrates a plurality of beams corresponding to the same direction according to an embodiment of the disclosure.

For example, beams formed in the same direction by the same antenna module, such as the first beam 1041 and second beam 1043 of FIG. 10, may correspond to the same direction. Since a handheld device such as the electronic device 801 is used at a position near a user, all beams that may be formed by the same antenna module may be referred to as corresponding to the same direction. For example, all of the beams 841, 842, 843, 844, 845, and 846 associated with the third antenna module 893 of FIG. 8 may be referred to as beams corresponding to the same direction. For example, when transmitting a first signal or second signal to the same base station (e.g., the first base station 899 of FIG. 8) using the beams 841, 842, 843, 844, 845, and 846 associated with the third antenna module 893 of FIG. 8, the beams 841, 842, 843, 844, 845, and 846 may be referred to as beams corresponding to the same direction. For another example, only portion of beams associated with the same antenna module are referred to as beams corresponding to the same direction. The 3-1st beam 841 and 3-6th beam 846 of the third antenna module 893 of FIG. 8 may be referred to as beams corresponding to different directions. Furthermore, as described below with reference to FIG. 12, a plurality of beams associated with different antenna modules may also be referred to as beams corresponding to the same direction.

In the disclosure, a plurality of beams corresponding to the same direction may be determined based on a PD standard. For example, whether a plurality of beams correspond to the same direction may be determined based on an amount of transmission power incident on a plane of a specified area S formed at a specified distance d from the electronic device 801. For example, it is assumed that each of a plurality of beams is transmitted at maximum transmission power for single-beam transmission. In this case, when the amount of transmission power due to the plurality of beams, observed on an arbitrary plane of the specified area S located at the specified distance d, exceeds a specified value, the plurality of beams may be referred to as corresponding to the same direction.

Referring to FIG. 12, the electronic device 801 may transmit a signal using a first beam 1291 associated with the third antenna module 893 and a second beam 1292 associated with the second antenna module 892. For example, a main lobe of the first beam 1291 and the second beam 1292 is incident on the arbitrary plane of the specified distance d. In this case, transmission power observed by the first beam 1291 and the second beam 1292 may fail to satisfy the power density (PD) standard. The first beam 1291 and the second beam 1292 may be referred to as beams corresponding to the same direction.

According to another embodiment, the memory 830 of the electronic device 801 may store information about a combination of beams corresponding to the same direction. The processor 820 may identify whether a plurality of beams correspond to the same direction using information about the plurality of beams used for transmission and the information about a combination corresponding to the same direction, stored in the memory 830.

According to another embodiment, the memory 830 of the electronic device 801 may store direction information together with an index for a plurality of beams. If the direction information about the plurality of beams used for transmission is the same, the processor 820 may determine that the plurality of beams correspond to the same direction. Table 1 shows beam information stored in the memory 830 according to an example.

TABLE 1

| | Beam identifiers | | | | | |
|---|---|---|---|---|---|---|
| 39 GHz band | 1-A-L | 1-B-L | 1-C-U | 1-D-U | 1-E-R | 1-F-R |
| 28 GHz band | 2-A-L | 2-B-L | 2-C-U | 2-D-U | 2-E-R | 2-F-R |
| Direction | LEFT | | UP | | RIGHT | |

For example, the first number (1 or 2) of the beam identifiers may represent a frequency band associated with a beam. The second identifier (A to F) of the beam identifiers may be set according to a direction of each beam. For example, Table 1 includes beam identifiers of an electronic device when forming beams of six directions as illustrated in FIG. 6. The third identifier of the beam identifiers may represent a direction. For example, L indicates that a beam is formed in a left direction with respect to the electronic device 801, U indicates that a beam is formed in an upward direction with respect to the electronic device 801, and R indicates that a beam is formed in a right direction with respect to the electronic device 801. When the identifiers of a plurality of identified beams are 1-A-L and 2-B-L, the electronic device 801 may determine that the two beams correspond to the same direction. Although the beam identifiers include direction information in Table 1, embodiments of the disclosure are not limited thereto. For example, direction information mapped to the beam identifiers may be separately stored.

For example, the first number (1 or 2) of the beam identifiers represent polarization associated with a beam. For example, the first number of 1 may indicate that a beam is formed as a vertically polarized wave, and the first number of 2 may indicate that a beam is formed as a horizontally polarized wave.

Regarding the above-mentioned examples, it has been described that the electronic device 801 identifies beams corresponding to the same direction using values stored in the memory 830, but embodiments of the disclosure are not limited thereto. For example, the electronic device 801 dynamically determines whether a plurality of beams correspond to the same direction based on the various criteria described above in relation to FIG. 12.

Figure 13:
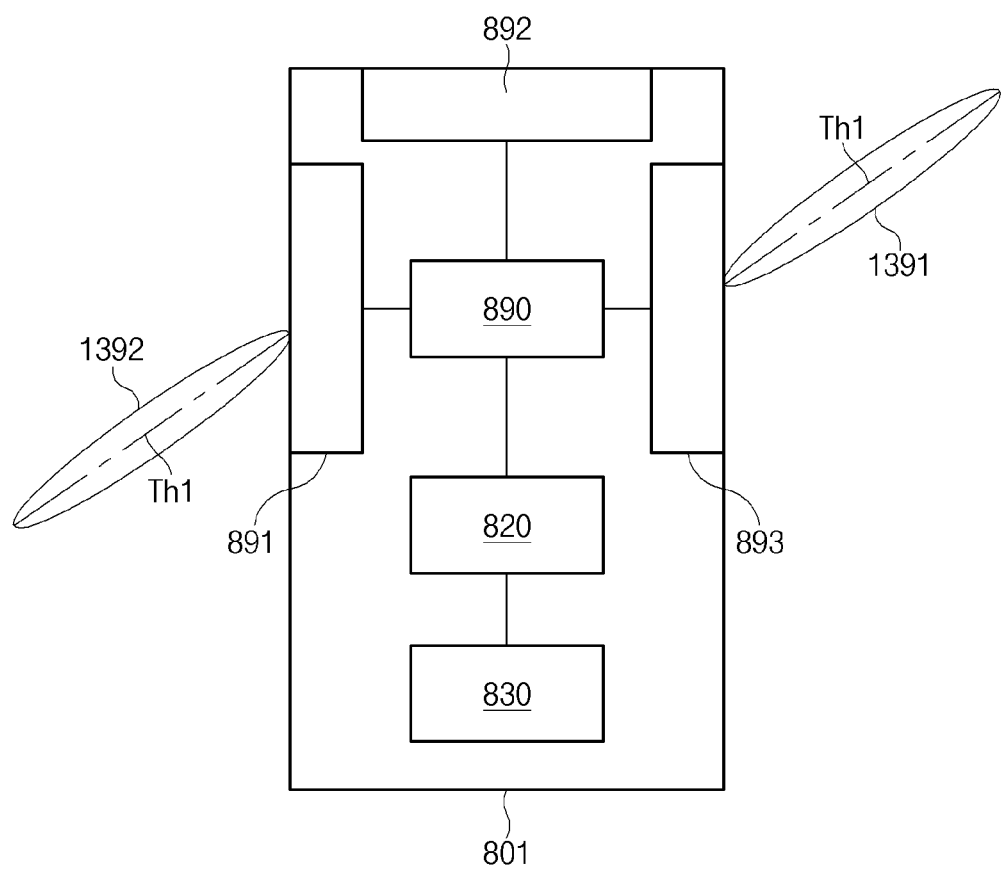
FIG. 13 illustrates multi-beam transmission based on a first threshold according to an embodiment of the disclosure.

FIG. 13 illustrates multi-beam transmission based on a first threshold according to an embodiment of the disclosure.

Referring to FIG. 13, the processor 820 may perform multi-beam transmission using a first beam 1391 and a second beam 1392. The first beam 1391 and the second beam 1392 may correspond to different directions (e.g., operation 1110—NO of FIG. 11). In this case, the electronic device 801 may perform multi-beam transmission without performing additional power backoff associated with multi-beam transmission. As described above with reference to FIG. 11, the electronic device 801 may perform additional power backoff (e.g., power backoff based on detection of an external object) based on a specified condition for at least one of the first beam 1391 or the second beam 1392. For example, the electronic device 801 determines transmission power of each of the first beam 1391 and the second beam 1392 within a range of a first threshold Th1. The first threshold Th1 is maximum transmission power set for single-beam transmission power, and may be changed according to whether to simultaneously transmit wireless signals of less than 6 GHz. That is, the electronic device 801 may control transmission power for each of the first beam 1391 and the second beam 1392 in substantially the same manner as in the case of single-beam transmission.

The first threshold Th1 may be maximum transmission power set for each beam when the electronic device 801 is unable to detect an external object (e.g., human body). For example, when the electronic device 801 is positioned in a free space, the electronic device 801 performs multi-beam transmission based on the first threshold Th1.

According to another embodiment, the electronic device 801 may perform power backoff on the first threshold Th1 if a specified condition (e.g., detection of an adjacent user or detection of a user adjacent to a beam direction) is satisfied. Hereinafter, for convenience, the first threshold Th1 may be referred to as maximum transmission power set for single-beam transmission. As described above, the maximum transmission power may be a value obtained by power backoff according to a specified condition or a value in a free space. In the following examples, the first threshold Th1 is a relative value rather than a particular absolute value. As described above, the maximum transmission power for single-beam transmission may be changed according to a specified condition.

Figure 14:
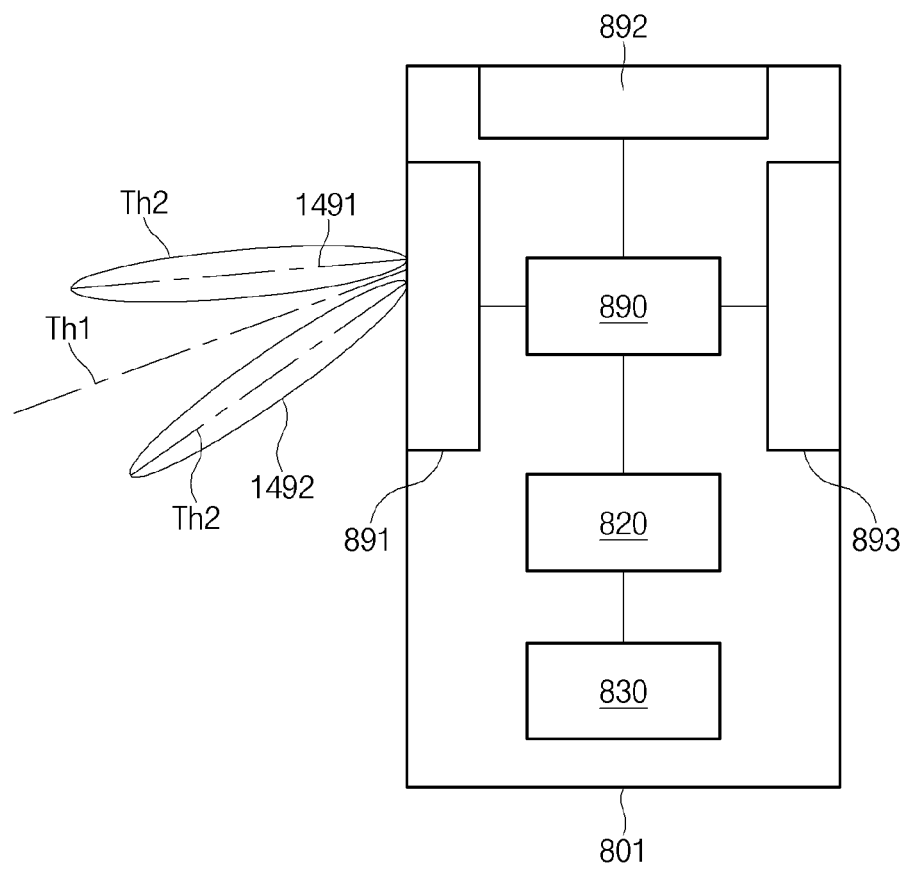
FIG. 14 illustrates multi-beam transmission based on a second threshold according to an embodiment of the disclosure.

FIG. 14 illustrates multi-beam transmission based on a second threshold according to an embodiment of the disclosure.

Referring to FIG. 14, the processor 820 may perform multi-beam transmission using a first beam 1491 and a second beam 1492. The first beam 1491 and the second beam 1492 may correspond to the same direction (e.g., operation 1110—Yes of FIG. 11). In this case, the electronic device 801 may perform additional power backoff (e.g., operation 1115 of FIG. 11) associated with multi-beam transmission. For example, the electronic device 801 determines transmission power of each of the first beam 1491 and the second beam 1492 within a range of a second threshold Th2. The second threshold Th2 may be a smaller value than the first threshold Th1 set for single-beam transmission power. For example, the second threshold Th2 corresponds to maximum transmission power backed off from the first threshold Th1 by as much as a specified value. That is, the electronic device 801 may control transmission power for each of the first beam 1491 and the second beam 1492 based on maximum transmission power lower than that for single-beam transmission.

As described above with reference to FIG. 11, the electronic device 801 may perform additional power backoff (e.g., power backoff based on detection of an external object) based on a specified condition for at least one of the first beam 1491 or the second beam 1492. For example, as described above with reference to FIG. 11, the first threshold Th1 is a relative value and may be changed. As the first threshold is changed, the second threshold Th2 may also be changed. According to an embodiment, the electronic device 801 may perform additional power backoff on the first threshold Th1 and/or the second threshold Th2 if a specified condition (e.g., detection of an adjacent user or detection of a user adjacent to a beam direction) is satisfied.

The power control method described above with reference to FIG. 14 is illustrative, and embodiments of the disclosure are not limited thereto. The example of FIG. 14 is for describing use of relatively low maximum transmission power in multi-beam transmission using a plurality of beams corresponding to the same direction. FIG. 14 does not limit a specific maximum transmission power value or backoff method. For example, the electronic device 801 may be configured to perform various backoff methods as described below with reference to FIG. 15.

Figure 15:
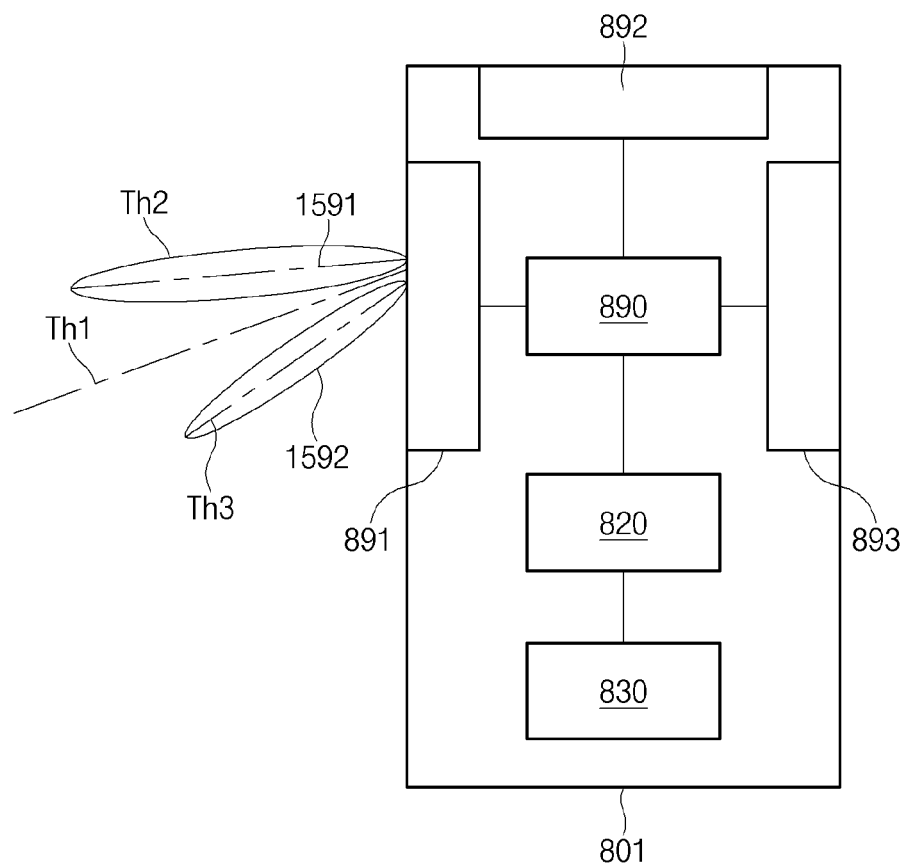
FIG. 15 illustrates multi-beam transmission based on a second threshold and a third threshold according to an embodiment of the disclosure.

FIG. 15 illustrates multi-beam transmission based on a second threshold and a third threshold according to an embodiment of the disclosure.

Referring to FIG. 15, the processor 820 may perform multi-beam transmission using a first beam 1591 and a second beam 1592. The first beam 1591 and the second beam 1592 may correspond to the same direction (e.g., operation 1110—Yes of FIG. 11). In this case, the electronic device 801 may perform additional power backoff (e.g., operation 1115 of FIG. 11) associated with multi-beam transmission. According to an embodiment, the electronic device 801 may apply different amounts of power backoff to a plurality of beams corresponding to the same direction. For example, the electronic device 801 determines transmission power of each of the first beam 1591 and the second beam 1592 within a range of the second threshold Th2 and a range of a third threshold Th3. The second threshold Th2 may be a smaller value than the first threshold Th1 set for single-beam transmission power. The third threshold Th3 may be a smaller value than the second threshold Th2. For example, the second threshold Th2 may correspond to maximum transmission power backed off from the first threshold Th1 by as much as a first specified value, and the third threshold Th3 may correspond to maximum transmission power backed off from the second threshold Th2 by as much as a second specified value. For example, as described above with reference to FIG. 13, the first threshold Th1 is a relative value and may be changed. As the first threshold is changed, the second threshold Th2 and the third threshold Th3 may also be changed.

According to another embodiment, the electronic device 801 may apply different amounts of power backoff based on the type of a cell associated with a plurality of beams. For example, the electronic device 801 applies a larger amount of power backoff to a beam associated with S-Cell than that to a beam associated with P-Cell. In this case, the electronic device 801 may control transmission power based on the second threshold Th2 with respect to the first beam 1591 associated with P-Cell, and may control transmission power based on the third threshold Th3 with respect to the second beam 1592 associated with S-Cell. For another example, the electronic device 801 applies a smaller amount of power backoff to a beam associated with S-Cell than that to a beam associated with P-Cell. In this case, the electronic device 801 may control transmission power based on the second threshold Th2 with respect to the first beam 1591 associated with S-Cell, and may control transmission power based on the third threshold Th3 with respect to the second beam 1592 associated with P-Cell.

According to another embodiment, the electronic device 801 may apply different amounts of power backoff based on a frequency band associated with a plurality of beams. For example, the electronic device 801 applies a larger amount of power backoff to a beam associated with a second band than that to a beam associated with a first band. In the example of FIG. 15, for example, the first beam 1591 may be associated with the second band (e.g., frequency band of at least 30 GHZ), and the second beam 1592 may be associated with the first band (e.g., frequency of at least 6 GHz and less than 30 GHZ). In this case, the electronic device 801 may control transmission power based on the second threshold Th2 with respect to the first beam 1591, and may control transmission power based on the third threshold Th3 with respect to the second beam 1592. For example, the electronic device 801 applies higher transmission power to a relatively high frequency band in consideration of path loss. For another example, the electronic device 801 applies lower transmission power to a relatively high frequency band in consideration of an effect on a human body.

As described above with reference to FIG. 11, the electronic device 801 may perform additional power backoff (e.g., power backoff based on detection of an external object) based on a specified condition for at least one of the first beam 1491 or the second beam 1492. For example, as described above with reference to FIG. 11, the first threshold Th1 is a relative value and may be changed. As the first threshold is changed, the second threshold Th2 may also be changed. According to another embodiment, the electronic device 801 may perform additional power backoff on the first threshold Th1 and/or the second threshold Th2 if a specified condition (e.g., detection of an adjacent user or detection of a user adjacent to a beam direction) is satisfied.

According to another embodiment, the electronic device 801 may apply different amounts of power backoff based on an amount of uplink resources associated with a plurality of beams. For example, the electronic device 801 applies relatively small power backoff to a beam to which a relatively large amount of radio resources are allocated (e.g., beam to which relatively many resource blocks are allocated). In the example of FIG. 15, for example, the amount of uplink resources associated with the first beam 1591 may be larger than the amount of uplink resources associated with the second beam 1592. In this case, the electronic device 801 may control transmission power based on the second threshold Th2 with respect to the first beam 1591, and may control transmission power based on the third threshold Th3 with respect to the second beam 1592.

According to another embodiment, the electronic device 801 may apply different amounts of power backoff based on polarization characteristics associated with a plurality of beams. For example, the electronic device 801 applies a larger amount of power backoff to a beam associated with a vertically polarized wave than that to a beam associated with a horizontally polarized wave.

According to another embodiment, the electronic device 801 may apply different amounts of power backoff based on characteristics of an antenna element associated with a plurality of beams. For example, the electronic device 801 applies a larger amount of power backoff to a beam associated with a dipole antenna than that to a beam associated with a patch antenna.

According to another embodiment, the electronic device 801 may perform power backoff using values stored in the memory 830. For example, the memory 830 stores a first backoff value corresponding to a difference between the first threshold Th1 and the second threshold Th2. The memory 830 may store a second backoff value corresponding to a difference between the second threshold Th2 and the third threshold Th3 or a difference between the first threshold Th1 and the third threshold Th3. For example, the second threshold Th2 may correspond to 21 dBm, and the third threshold Th3 may correspond to 19 dBm.

The electronic device 801 may obtain, from the memory 830, a backoff value to be applied to multi-beam transmission using a plurality of beams corresponding to the same direction. For example, the memory 830 stores a beam combination and information about a backoff value mapped to the beam combination. For example, the electronic device 801 performs backoff on each beam using an identified beam combination and the information about a backoff value stored in the memory. For another example, the electronic device 801 determines a backoff value to be applied to each beam according to the above-mentioned examples (e.g., frequency band and/or associated cell type).

Figure 16:
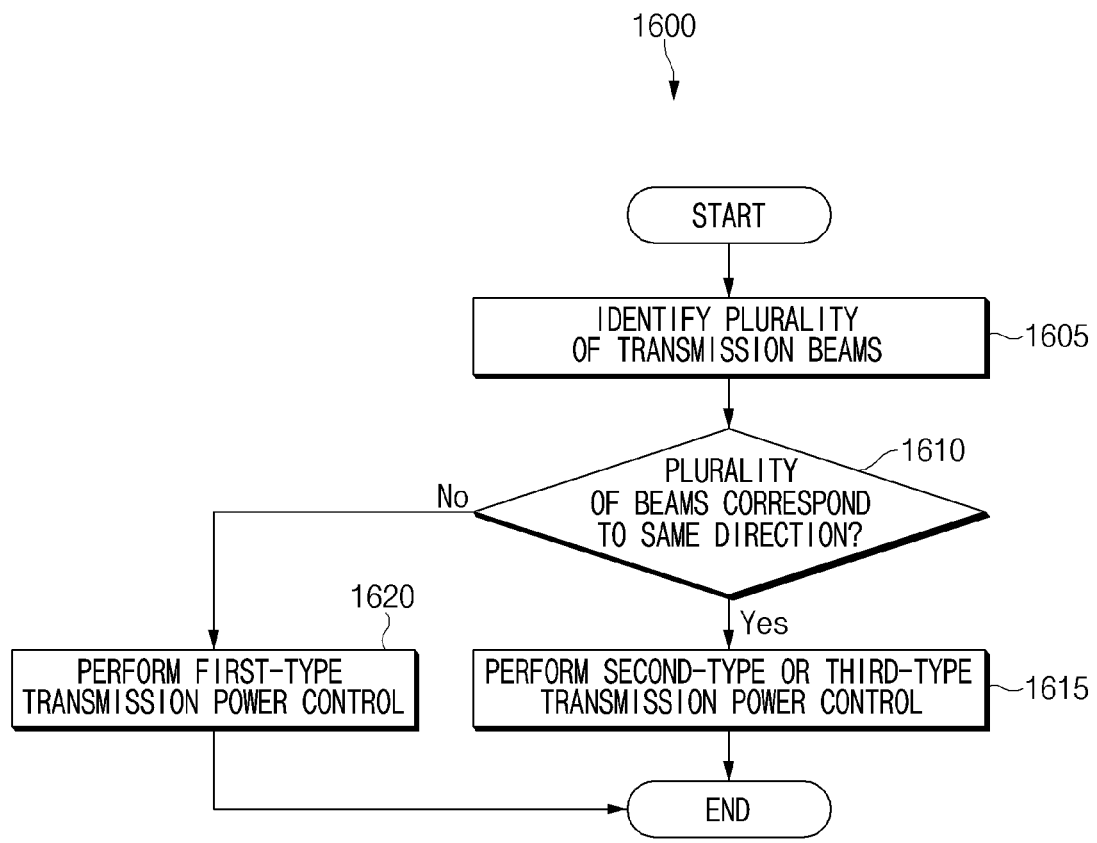
FIG. 16 is a flowchart illustrating a transmission power control method according to an embodiment of the disclosure.

FIG. 16 is a flowchart illustrating a transmission power control method according to an embodiment of the disclosure.

Referring to FIG. 16, in a method 1600, in operation 1605, the processor 820 of the electronic device 801 may identify a plurality of transmission beams (e.g., operation 1105 of FIG. 11). For example, the processor 820 performs operation 1605, when there is data to be transmitted, when an uplink grant is received, or when performing beam sweeping. For another example, the processor 820 performs operation 1605 based on a user input or specified interval.

In operation 1610, the processor 820 may determine whether the plurality of beams correspond to the same direction. For example, as described above in relation to operation 1110 of FIG. 11, the processor 820 determines whether the plurality of beams correspond to the same direction based on various methods. The definition of the plurality of beams corresponding to the same direction is the same as described above with reference to FIG. 12.

When the plurality of beams correspond to the same direction (e.g., operation 1610—Yes), the processor 820 may perform second-type or third-type transmission power control in operation 1615. For example, the second-type transmission power control is referred to as performing the same power backoff on a plurality of beams as described above with reference to FIG. 14. For example, the third-type transmission power control is referred to as performing different power backoff on a plurality of beams as described above with reference to FIG. 15.

For example, the processor 820 is configured to perform the second-type transmission power control or the third-type transmission power control based on a combination of a plurality of beams. The processor 820 may be configured to apply the second-type transmission power control to a combination of specified beams and apply the third-type transmission power control to a combination of other beams. For another example, the processor 820 is configured to apply only the second-type transmission power control. For another example, the processor 820 is configured to apply only the third-type transmission power control.

When the plurality of beams do not correspond to the same direction (e.g., operation 1610—No), the processor 820 may perform first-type transmission power control in operation 1620. For example, the first-type transmission power control represents that additional backoff is not performed for multi-beam transmission as described above with reference to FIG. 13.

The processor 820 may perform multi-beam transmission while performing transmission power control determined according to the flowchart 1600 of FIG. 16. For example, as described above with reference to FIGS. 8 to 10, the processor 820 may achieve spatial multiplexing or spatial diversity through multi-beam transmission.

Figure 17:
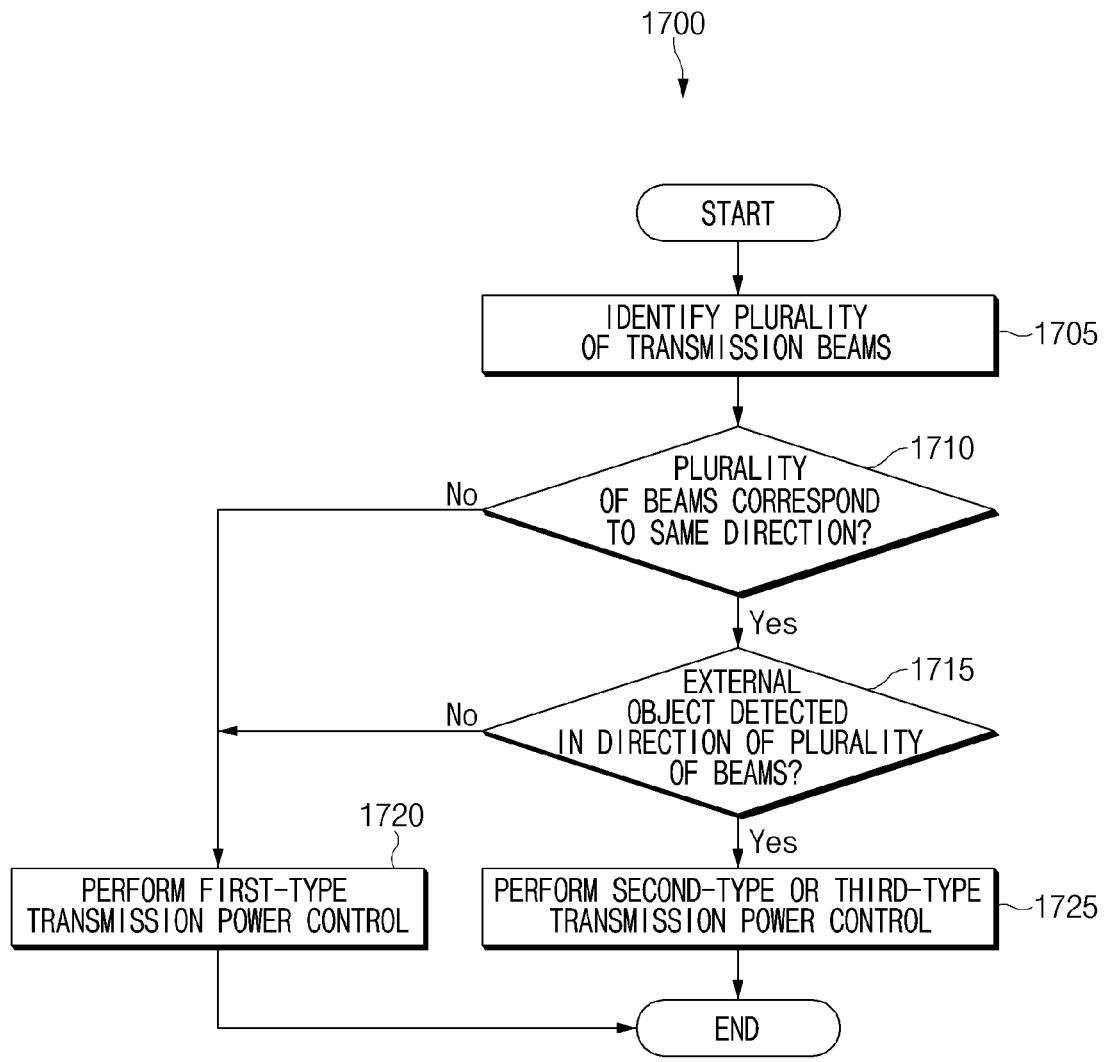
FIG. 17 is a flowchart illustrating a transmission power control method according to an embodiment of the disclosure.

FIG. 17 is a flowchart illustrating a transmission power control method according to an embodiment of the disclosure.

Referring to FIG. 17, in a method 1700, in operation 1705, the processor 820 of the electronic device 801 may identify a plurality of transmission beams (e.g., operation 1105 of FIG. 11). For example, the processor 820 performs operation 1705, when there is data to be transmitted, when an uplink grant is received, or when performing beam sweeping. For another example, the processor 820 performs operation 1705 based on a user input or specified interval.

In operation 1710, the processor 820 may determine whether the plurality of beams correspond to the same direction. For example, as described above in relation to operation 1110 of FIG. 11, the processor 820 determines whether the plurality of beams correspond to the same direction based on various methods. The definition of the plurality of beams corresponding to the same direction is the same as described above with reference to FIG. 12.

When the plurality of beams correspond to the same direction (e.g., operation 1710—Yes), the processor 820 determines whether an external object is detected in a direction of the plurality of beams in operation 1715. For example, the processor 820 identifies a relative position (e.g., direction and/or distance) of the external object relative to the electronic device and/or the type of the external object. For example, the processor 820 detects the direction and/or type of the external object using a proximity sensor, a grip sensor, and/or a means for transmitting/receiving radio waves. For example, the processor 820 identifies the position and type of the external object by transmitting a signal and receiving a reflected wave using an antenna module (e.g., the antenna modules 891, 892, and 893 of FIG. 8). The processor 820 may identify the position and type of the external object by comparing a phase and magnitude between a transmitted signal and a received signal.

When the plurality of beams do not correspond to the same direction (e.g., operation 1710—No), the processor 820 may perform first-type transmission power control in operation 1720. For example, the first-type transmission power control represents that additional backoff is not performed for multi-beam transmission. In the case of the first-type transmission power control, the processor 820 may perform power backoff on each transmission beam based on the external object. For example, the plurality of beams includes a first beam oriented in a first direction and a second beam oriented in a second direction. When the external object (e.g., human body) is detected in the first direction but is not detected in the second direction, the processor 820 may perform power backoff on the first beam based on the first beam and may not perform additional power backoff on the second beam.

When the external object is detected in the direction of the plurality of beams (e.g., operation 1715—Yes), the processor 820 performs second-type or third-type transmission power control in operation 1725. The second-type transmission power control and the third-type transmission power control may be referred to as transmission power control for applying additional backoff to multi-beam transmission. For example, the second-type transmission power control is referred to as performing the same power backoff on a plurality of beams as described above with reference to FIG. 14. For example, the third-type transmission power control is referred to as performing different power backoff on a plurality of beams as described above with reference to FIG. 15.

For example, the processor 820 is configured to perform the second-type transmission power control or the third-type transmission power control based on a combination of a plurality of beams. The processor 820 may be configured to apply the second-type transmission power control to a combination of specified beams and apply the third-type transmission power control to a combination of other beams. For another example, the processor 820 is configured to apply only the second-type transmission power control. For another example, the processor 820 may be configured to apply only the third-type transmission power control.

When the external object is not detected in the direction of the plurality of beams (e.g., operation 1715—No), the processor 820 may perform first-type transmission power control in operation 1720. For example, the first-type transmission power control represents that additional backoff is not performed for multi-beam transmission. Since the external object is not detected in the direction of the plurality of beams, the processor 820 may transmit a signal without performing power backoff based on the external object.

The processor 820 may perform multi-beam transmission while performing transmission power control determined according to the flowchart 1700 of FIG. 17. For example, as described above with reference to FIGS. 8 to 10, the processor 820 achieves spatial multiplexing or spatial diversity through multi-beam transmission.

Figure 18:
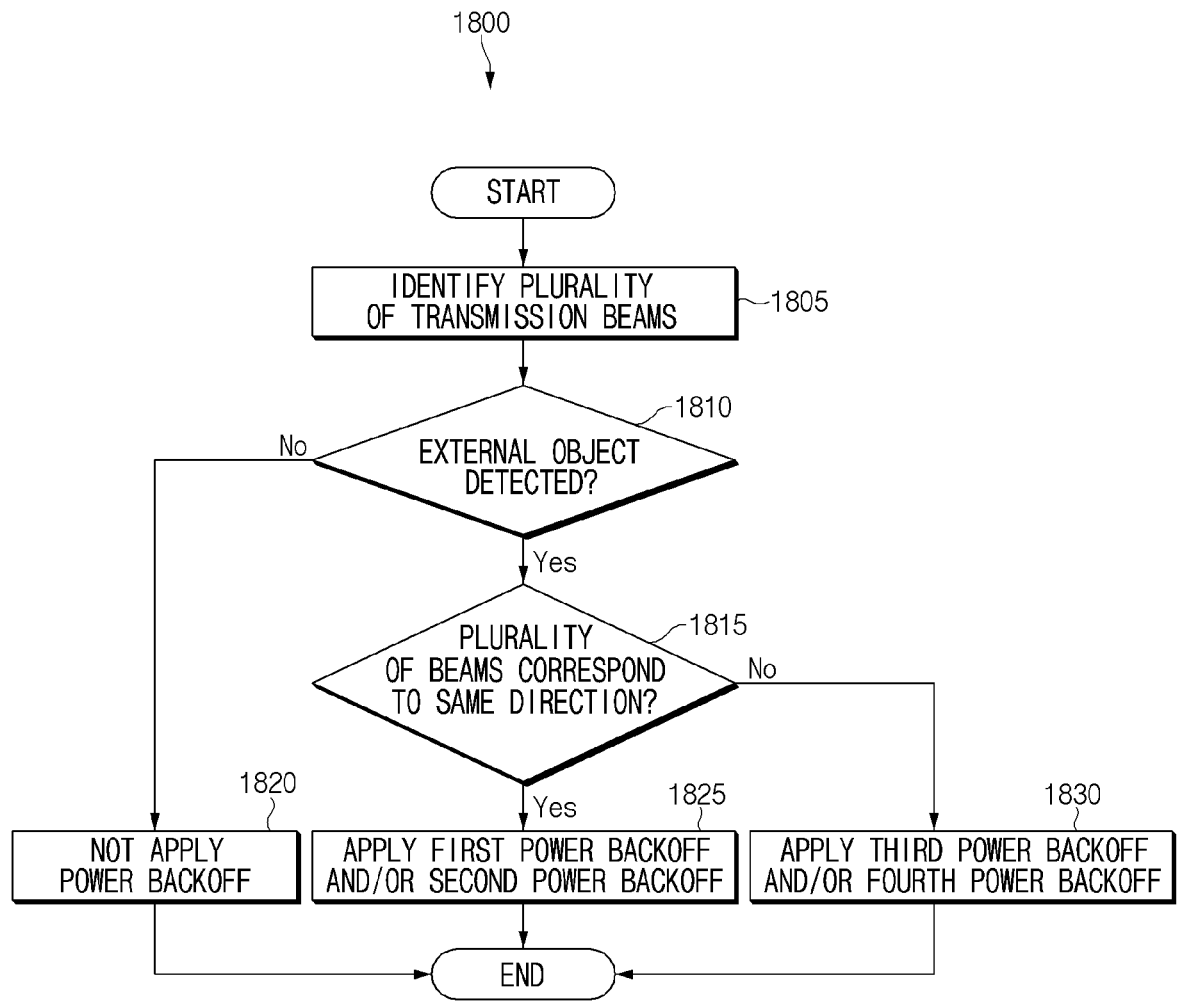
FIG. 18 is a flowchart illustrating a transmission power control method according to an embodiment of the disclosure.

FIG. 18 is a flowchart illustrating a transmission power control method according to an embodiment of the disclosure.

According to an embodiment, in operation 1805, the processor 820 of the electronic device 801 may identify a plurality of transmission beams (e.g., operation 1105 of FIG. 11).

Referring to FIG. 18, in a method 1800, in operation 1810, the processor 820 may determine whether an external object is detected. The processor 820 may determine that the external object has been detected when an object adjacent to the electronic device 801 is detected. The processor 820 may determine that the external object has been detected when the external object is detected in a direction corresponding to at least one of the plurality of beams. The processor 820 may determine that the external object has not been detected when an adjacent object is not detected or when an external object is not detected in directions corresponding to the plurality of beams.

When the external object is not detected (e.g., operation 1810-N), the processor 820 may not apply backoff to transmission power of the plurality of beams in operation 1820. For example, the electronic device 801 is assumed to be positioned in a free space.

When the external object is detected (e.g., operation 1810-Y), the processor 820 may determine whether the plurality of beams correspond to the same direction in operation 1815. For example, as described above in relation to operation 1110 of FIG. 11, the processor 820 determines whether the plurality of beams correspond to the same direction based on various methods. The definition of the plurality of beams corresponding to the same direction is the same as described above with reference to FIG. 12.

When the plurality of beams correspond to the same direction (e.g., operation 1815-Y), the processor 820 may apply first power backoff and/or second power backoff to the plurality of beams in operation 1825. For example, when the same level of backoff is applied as in FIG. 14, the first power backoff is applied to the plurality of beams. For example, when different levels of backoff are applied as in FIG. 15, the first power backoff is applied to a first beam among the plurality of beams, and the second power backoff may be applied to a second beam among the plurality of beams.

When the plurality of beams do not correspond to the same direction (e.g., operation 1815—No), the processor 820 may apply third power backoff and/or fourth power backoff in operation 1830. For example, each of the third power backoff and the fourth power backoff is a smaller value than the first power backoff and the second power backoff. In operation 1825, since the plurality of beams correspond to the same direction, the processor 820 may apply power backoff of a relatively large value compared to operation 1830. For example, the third power backoff is applied to the plurality of beams. For example, the third power backoff is applied to a first beam among the plurality of beams, and the fourth power backoff may be applied to a second beam among the plurality of beams. For example, the third power backoff is applied only to beams corresponding to a direction in which the external object has been detected among the plurality of beams, and the fourth power backoff, which is relatively small, may be applied to beams in a direction in which the external object has not been detected.

Figure 19:
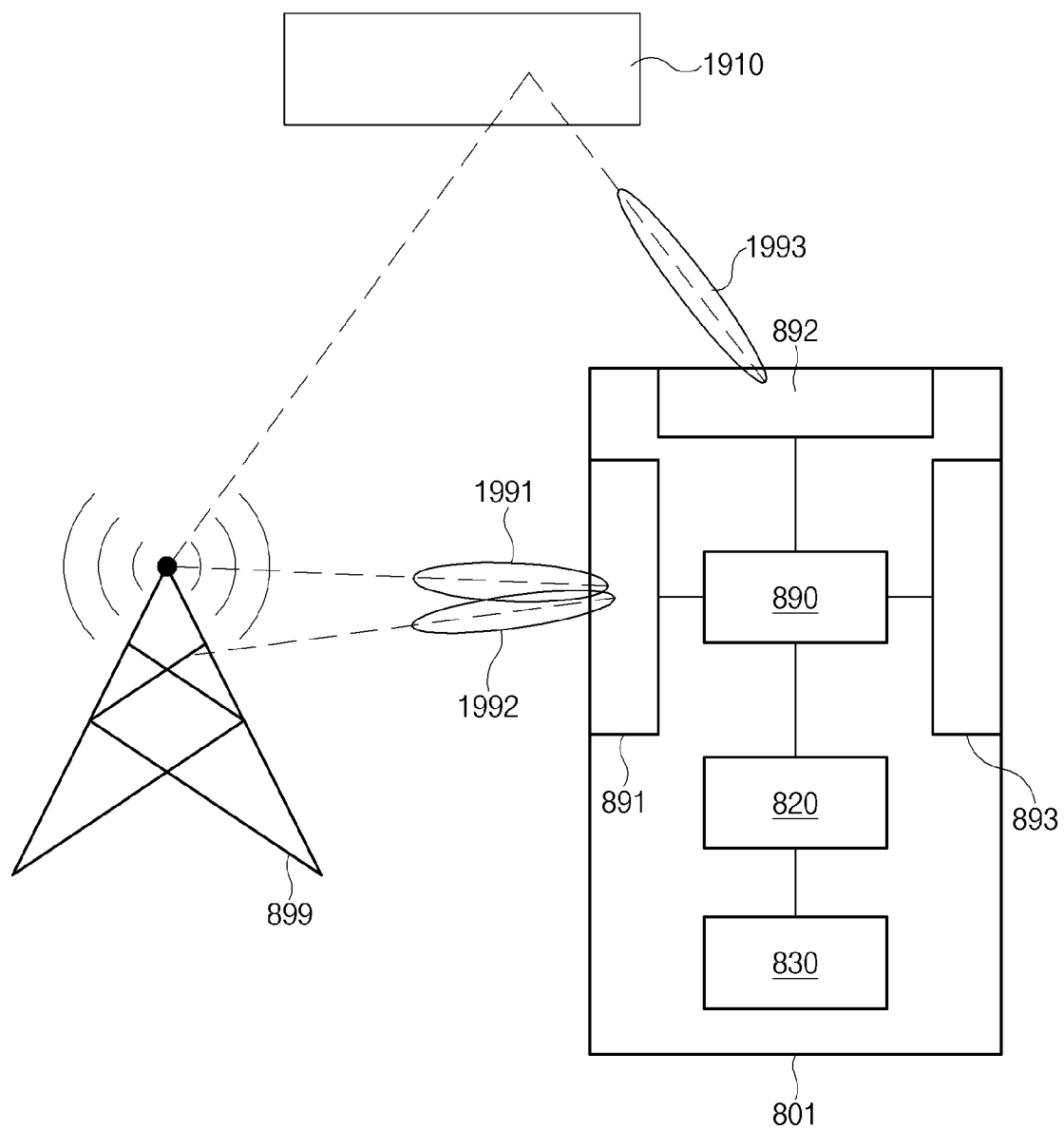
FIG. 19 illustrates transmission beam management of an electronic device according to an embodiment of the disclosure.

FIG. 19 illustrates transmission beam management of an electronic device according to an embodiment of the disclosure.

According to an embodiment, when using a plurality of transmission beams, the electronic device 801 may control the transmission beams so as not to correspond to the same direction. For example, when a plurality of transmission beams correspond to the same direction, the electronic device 801 determines whether a beam satisfying a specified condition is present among beams not corresponding to the same direction and the plurality of transmission beams. For example, received signal strength of a beam (e.g., reference signal received power) is at least a specified value, the beam is determined to be a beam corresponding to the specified condition. In this case, the electronic device 801 may change at least one of the plurality of transmission beams for the beam satisfying the specified condition. The electronic device 801 may control a plurality of transmission beams so as not to correspond to the same direction by changing a beam. Through the transmission beam control, the electronic device 801 may apply relatively small power backoff compared to the case where a plurality of transmission beams are oriented in the same direction. The electronic device 801 may provide improved communication quality by reducing the amount of backoff.

Referring to FIG. 19, the electronic device 801 may communicate with the first base station 899. For example, the electronic device 801 may identify, as a plurality of transmission beams, a first beam 1991 corresponding to a line of sight (LoS) and a second beam 1992 adjacent to the first beam 1991. The first beam 1991 and the second beam 1992 may be assumed to be beams corresponding to the same direction. In this case, the electronic device 801 may identify whether a beam is present, which satisfies the specified condition and corresponds to a direction different from that of the first beam 1991 and the second beam 1992. For example, a third beam 1993 does not correspond to the direction of the first beam 1991 and the second beam 1992 but receives a signal reflected from a reflector 1910. For example, reference signal received power associated with the third beam 1993 is at least a specified value. In this case, the electronic device 801 may communicate with the first base station 899 using the third beam 1993 instead of the first beam 1991 or the second beam 1992. For example, the electronic device 801 communicates using the first beam 1991 and the third beam 1993 or the second beam 1992 and the third beam 1993. The electronic device 801 may change a beam having low communication quality among the first beam 1991 and the second beam 1992 for the third beam 1993. The electronic device 801 may reduce the amount of power backoff using the third beam 1993.

Figure 20:
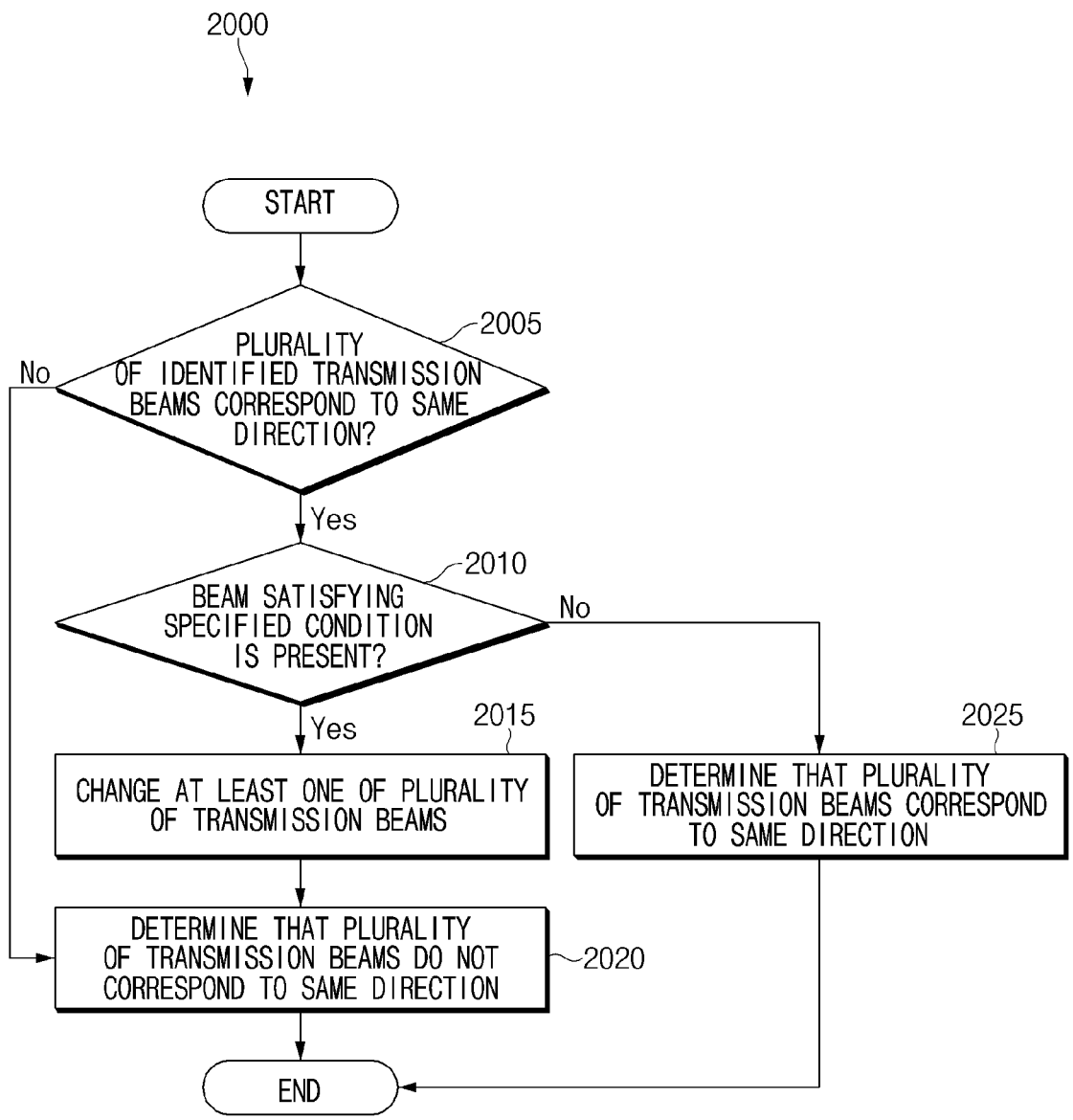
FIG. 20 is a flowchart illustrating a method of determining whether a plurality of transmission beams of an electronic device correspond to the same direction according to an embodiment of the disclosure.

FIG. 20 is a flowchart illustrating a method of determining whether a plurality of transmission beams of an electronic device correspond to the same direction according to an embodiment of the disclosure.

The transmission beam management methods of the electronic device described above with reference to FIG. 19 may be combined with the transmission beam power control methods described above with reference to FIGS. 11 to 18. For example, the method of the electronic device of FIG. 20 may correspond to operation 1110 of FIG. 11, operation 1610 of FIG. 16, operation 1710 of FIG. 17, or operation 1815 of FIG. 18.

Referring to FIG. 20, in a method 2000, in operation 2005, the processor 820 may determine whether a plurality of identified transmission beams correspond to the same direction. For example, as described above in relation to operation 1110 of FIG. 11, the processor 820 may determine whether the plurality of beams correspond to the same direction based on various methods. The definition of the plurality of beams corresponding to the same direction is the same as described above with reference to FIG. 12.

When the plurality of identified transmission beams do not correspond to the same direction (e.g., operation 2005—N), the processor 820 may determine that the plurality of transmission beams do not correspond to the same direction in operation 2020.

When the plurality of identified transmission beams correspond to the same direction (e.g., operation 2005—Y), the processor 820 determines whether a beam satisfying a specified condition is present in operation 2010. For example, a beam having reception strength of at least a specified value and corresponding to a direction that is different from that of the plurality of transmission beams may satisfy the specified condition.

When there is no beam satisfying the specified condition (e.g., operation 2010—N), the processor 820 may determine that the plurality of beams correspond to the same direction in operation 2025.

When there is a beam satisfying the specified condition (e.g., operation 2010—Y), the processor 820 may change at least one of the plurality of transmission beams for the beam satisfying the specified condition in operation 2015. According to a change in the transmission beams, the processor 820 may determine that the plurality of transmission beams do not correspond to the same direction (e.g., operation 2020).

A structure of the electronic device of the disclosure and operations performed by the electronic device have been described with reference to FIGS. 1 to 20. However, the above-mentioned structure and/or operations of the electronic device are illustrative, and obvious modifications may also be included in the embodiments of the disclosure.

For example, the electronic device may include a means for identifying a transmission beam. The means for identifying a transmission beam may obtain information of a beam that may be used in transmission by the electronic device. The means for identifying a transmission beam may also identify or determine whether a plurality of identified beams correspond to the same direction. For example, a combination of any configurations of the electronic device 801 capable of performing operations 1605 and 1610 of FIG. 16 is included in the means for identifying a transmission beam.

For example, the electronic device includes a means for controlling transmission power. The means for controlling transmission power may be configured to control transmission power based on a combination of beams (e.g., a combination of beams corresponding to the same direction or a combination of beams corresponding to different directions) identified by the means for identifying a transmission beam. For example, a combination of any configurations of the electronic device 801 capable of performing operations 1615 and 1620 of FIG. 16 is included in the means for controlling transmission power.

For example, the electronic device includes a means for transmitting a wireless signal. The means for transmitting a wireless signal may transmit a wireless signal at transmission power controlled by the means for controlling transmission power. For example, any components of the electronic device 801 for transmitting a wireless signal is included in the means for transmitting a wireless signal.

According to another embodiment, the electronic device may include a means for detecting an external object. The means for detecting an external object may identify a relative position (e.g., direction and/or distance) of the external object relative to the electronic device and/or the type of the external object. For example, the means for detecting an external object identifies whether an external object is an object of a type corresponding to a human (e.g., organic matter). For example, the electronic device detects an external object using a proximity sensor, a grip sensor, and/or a means for transmitting/receiving radio waves. For example, the electronic device identifies the position and type of the external object by transmitting a signal and receiving a reflected wave using an antenna module (e.g., the antenna modules 891, 892, and 893 of FIG. 8). The electronic device may identify the position and type of the external object by comparing a phase and magnitude between a transmitted signal and a received signal.

In the above-mentioned various embodiments, the electronic device (e.g., the electronic device 801 of FIG. 8) may apply the above-mentioned transmission power control methods based on an external object. For example, when a plurality of transmission beams correspond to the same direction (e.g., operation 1610—Yes), the electronic device 801 determines whether an external object corresponding to a human is present in the same direction. When there is no human present in the direction corresponding to the plurality of beams, the electronic device 801 may perform first-type transmission power control (e.g., operation 1620 of FIG. 16). When there is a human present in the direction corresponding to the plurality of beams, the electronic device 801 may perform second-type transmission power control or third-type transmission power control (e.g., operation 1615 of FIG. 16).

According to another embodiment, a mobile electronic device (e.g., the electronic device 801) may include at least one antenna module (e.g., 891, 892, and/or 893 of FIG. 8) including at least one array antenna, a processor (e.g., the processor 820) operatively connected to the at least one antenna module, and a memory (e.g., the memory 830) operatively connected to the processor. The memory may include instructions that, when executed, cause the processor to: identify a plurality of beams including a first beam and a second beam for communicating with at least one base station using the at least one antenna module; identify, when the first beam and the second beam correspond to a same first direction, a third beam which corresponds to a direction different from the first direction and of which receive signal strength from the at least one base station is at least a specified value; communicate with the at least one base station by applying, to the first beam and the second beam, power backoff for beams corresponding to the same direction when identification of the third beam fails; and change the second beam for the third beam and communicate with the at least one base station using the first beam and the third beam without applying the power backoff for beams corresponding to the same direction when the third beam is identified.

The instructions, when executed, may cause the processor to control transmission power associated with each of the plurality of beams based on maximum transmission power that is the same as that for single-beam transmission when the plurality of beams correspond to different directions. The instructions, when executed, may cause the processor to identify whether the first beam and the second beam correspond to the same direction based on beam index information about the plurality of beams. The at least one antenna module may include a first antenna module and a second antenna module, which are arranged so as to be oriented in different directions. When the first beam and the second beam are associated with the same antenna module among the first antenna module and the second antenna module, the first beam and the second beam may correspond to the same direction. The first beam may correspond to a vertically polarized wave, and the second beam may correspond to a horizontally polarized wave. The instructions, when executed, may cause the processor to apply first power backoff to the first beam and apply second power backoff that is larger than the first power backoff to the second beam when identification of the third beam fails. The first beam may be associated with a higher frequency band compared to the second beam, or the first beam and the second beam may be associated with cells of different types. The instructions, when executed, may cause the processor to perform spatial multiplexing or spatial diversity by transmitting a wireless signal using the plurality of beams.

According to an embodiment, a method for multi-beam transmission of a mobile communication device may include: identifying a plurality of beams including a first beam and a second beam to be used for transmission; determining whether the first beam and the second beam correspond to a same first direction; determining whether a third beam which corresponds to a direction different from the first direction and of which receive signal strength is at least a specified value is present when the first beam and the second beam correspond to the same first direction; transmitting a signal by applying, to the first beam and the second beam, power backoff for beams corresponding to the same direction when the third beam is not present; and changing the second beam for the third beam and transmitting the signal without applying the power backoff for beams corresponding to the same direction when the third beam is present.

The method may further include controlling transmission power associated with each of the first beam and the second beam based on maximum transmission power that is the same as that for single-beam transmission when the first beam and the second beam correspond to different directions. The determining whether the plurality of identified beams correspond to the same direction may include identifying whether the first beam and the second beam correspond to the same direction based on beam index information about the first beam and the second beam. The determining whether the first beam and the second beam correspond to the same direction may include identifying that the first beam and the second beam correspond to the same direction when the first beam and the second beam are associated with the same antenna module among a plurality of antenna modules of the electronic device. The transmitting of the signal by applying, to the first beam and the second beam, the power backoff for beams corresponding to the same direction may include applying first power backoff to the first beam and applying second power backoff that is larger than the first power backoff to the second beam. The first beam may be associated with a higher frequency band compared to the second beam, or the first beam and the second beam may be associated with cells of different types. The method may further include transmitting a wireless signal for spatial multiplexing or spatial diversity using the first beam and the second beam or the first beam and the third beam.

A mobile electronic device according to an embodiment may include a first antenna module including at least one array antenna, a second antenna module including at least one array antenna, a processor operatively connected to the first antenna module and the second antenna module, and a memory operatively connected to the processor. The memory may store instructions that, when executed, cause the processor to: form a first beam and a second beam using at least one of the first antenna module or the second antenna module; and control transmission power associated with the first beam and the second beam based on maximum transmission power that is relatively low compared to that of single-beam transmission when the first beam and the second beam correspond to the same direction. The instructions, when executed, may cause the processor to control transmission power associated with each of the first beam and the second beam based on maximum transmission power that is the same as that for the single-beam transmission when the first beam and the second beam correspond to different directions. The instructions, when executed, may cause the processor to apply first power backoff to first transmission power control associated with the first beam and apply second power backoff that is larger than the first power backoff to second transmission power control associated with the second beam. The first beam may be associated with a higher frequency band compared to the second beam, or the first beam and the second beam may be associated with cells of different types. The instructions, when executed, may cause the processor to perform spatial multiplexing or spatial diversity by transmitting a wireless signal using the first beam and the second beam.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. A mobile electronic device comprising:
   a first antenna module comprising at least one array antenna;
   a second antenna module comprising at least one array antenna;
   at least one processor operatively connected to the first antenna module and the second antenna module; and
   memory electrically connected to the at least one processor, wherein the memory stores instructions that, when executed, cause the at least one processor to:
identify a plurality of beams comprising a first beam and a second beam for communicating with at least one base station using the first antenna module,
determine, when the first beam and the second beam correspond to a same antenna module, a third beam, which corresponds to a direction different from a direction of the first beam and of which a received signal strength from the at least one base station exceeds a specified value, is available,
based on a determination that the third beam is unavailable, communicate with the at least one base station by applying, to the first beam and the second beam, power backoff, and
based on a determination that the third beam is available, change the second beam for the third beam and communicate with the at least one base station using the first beam and the third beam without applying the power backoff.

2. The mobile electronic device of claim 1, wherein the instructions, when executed, further cause the at least one processor to control transmission power associated with each of the plurality of beams based on maximum transmission power that is the same as that for a single-beam transmission when the plurality of beams correspond to different directions.

3. The mobile electronic device of claim 1, wherein the instructions, when executed, further cause the at least one processor to identify whether the first beam and the second beam correspond to the same direction as the first beam and the second beam being formed by the same antenna module.

4. The mobile electronic device of claim 1,
wherein the first antenna module and the second antenna module are arranged so as to be oriented in different directions, and
wherein, when the first beam and the second beam are associated with the same antenna module among the first antenna module and the second antenna module, the first beam and the second beam correspond to the same direction.

5. The mobile electronic device of claim 1,
wherein the first beam corresponds to a vertically polarized wave, and
wherein the second beam corresponds to a horizontally polarized wave.

6. The mobile electronic device of claim 1, wherein the instructions, when executed, further cause the at least one processor to:
apply first power backoff to the first beam; and
apply second power backoff that is larger than the first power backoff to the second beam when the third beam is unavailable.

7. The mobile electronic device of claim 6,
wherein the first beam is associated with a higher frequency band compared to the second beam, or
wherein the first beam and the second beam are associated with cells of different types.

8. The mobile electronic device of claim 1, wherein the instructions, when executed, further cause the at least one processor to perform spatial multiplexing or spatial diversity by transmitting a wireless signal using the plurality of beams.

9. A method for multi-beam transmission of a mobile communication device, the method comprising:
identifying a plurality of beams comprising a first beam and a second beam to be used for transmission;
determining, when the first beam and the second beam corresponds to a same antenna module, whether a third beam which corresponds to a direction different from a direction of the first beam and of which a received signal strength is exceeds at least a specified value is available;
based on a determination that the third beam is unavailable, transmitting a signal by applying, to the first beam and the second beam, power backoff; and
based on a determination that the third beam is available, changing the second beam for the third beam and transmitting the signal without applying the power backoff.

10. The method of claim 9, further comprising:
controlling transmission power associated with each of the first beam and the second beam based on maximum transmission power that is the same as that for a single-beam transmission when the first beam and the second beam correspond to different directions.

11. The method of claim 10, further comprising, determining that the first beam and the second beam correspond to the same direction by identifying that the first beam and the second beam are associated with the same antenna module among a plurality of antenna modules of the mobile communication device.

12. The method of claim 10, wherein a reference regulation of a power density is satisfied by controlling the transmission power.

13. The method of claim 9, wherein the transmitting of the signal by applying, to the first beam and the second beam, the power backoff comprises:
applying first power backoff to the first beam; and
applying second power backoff that is larger than the first power backoff to the second beam.

14. The method of claim 13,
wherein the first beam is associated with a higher frequency band compared to the second beam, or
wherein the first beam and the second beam are associated with cells of different types.

15. The method of claim 9, further comprising:
transmitting a wireless signal for spatial multiplexing or spatial diversity using the first beam and the second beam or the first beam and the third beam.

16. The method of claim 9, further comprising performing a multiple-input multiple-output (MIMO) operation, orthogonal polarization transmission, or spatial multiplexing with a base station using the first beam and the third beam.

* * * * *